United States Patent [19]

Monoi

[11] Patent Number: 5,459,509

[45] Date of Patent: Oct. 17, 1995

[54] METHOD FOR TRANSFERRING CHARGE, CHARGE TRANSFER DEVICE AND SOLID STATE IMAGE SENSING DEVICE USING THE SAME

[75] Inventor: Makoto Monoi, Tokyo, Japan

[73] Assignee: Kabushiki Kaisha Toshiba, Kanagawa, Japan

[21] Appl. No.: 12,142

[22] Filed: Jan. 29, 1993

[30] Foreign Application Priority Data

Jan. 31, 1992 [JP] Japan .................................. 4-046197

[51] Int. Cl.⁶ .................................................. H04N 5/335
[52] U.S. Cl. ........................ 348/248; 348/249; 348/318; 348/319; 348/322; 348/323
[58] Field of Search .......................... 358/213.23, 213.11, 358/213.29, 213.28, 213.31; 357/241, 231, 249; 348/248, 249, 318, 319, 322, 323

[56] References Cited

U.S. PATENT DOCUMENTS

| 4,807,037 | 2/1989 | Iesaka et al. | 358/213.31 |
|---|---|---|---|
| 4,897,728 | 1/1990 | Yamada | 358/213.23 |
| 4,980,769 | 12/1990 | Inuiya | 358/213.19 |
| 5,040,071 | 8/1991 | Stevens | 358/213.26 |

FOREIGN PATENT DOCUMENTS

| 0346102A2 | 6/1989 | European Pat. Off. | H04N 3/15 |
|---|---|---|---|
| 62-104076 | 5/1987 | Japan | H01L 29/76 |
| WO88/06349 | 8/1988 | WIPO | H01L 29/78 |

OTHER PUBLICATIONS

Prior Art of FIGS. 1–5 in the spec.
H. Herbst, et al., "One–dimensional CCD–imager with High Resolution", Siemens AG Research Laboratories, Electrography Conference 1976, Cambridge, England, pp. 564–575.

*Primary Examiner*—Joseph H. Mancuso
*Assistant Examiner*—Bipin Shalwala
*Attorney, Agent, or Firm*—Finnegan, Henderson, Farabow, Garrett & Dunner

[57] ABSTRACT

In the method of transferring charges generated by signal charge generating sections in response to light, a signal charge existing under some transfer electrode of the plural charge transfer sections arranged in parallel to each other is transferred through one of a plurality of connecting sections formed under the transfer electrode corresponding to another charge transfer section among the plural connecting sections formed between the plural charge transfer sections, on the basis of a predetermined drive pulse; and when the charge is transferred to the other charge transfer section, a charge remaining at the primary charge transfer section is transferred from the primary charge transfer section to the other charge transfer section, through the other connecting section among the plural connecting sections, to combine the remaining charge with the signal charge previously transferred.

13 Claims, 21 Drawing Sheets

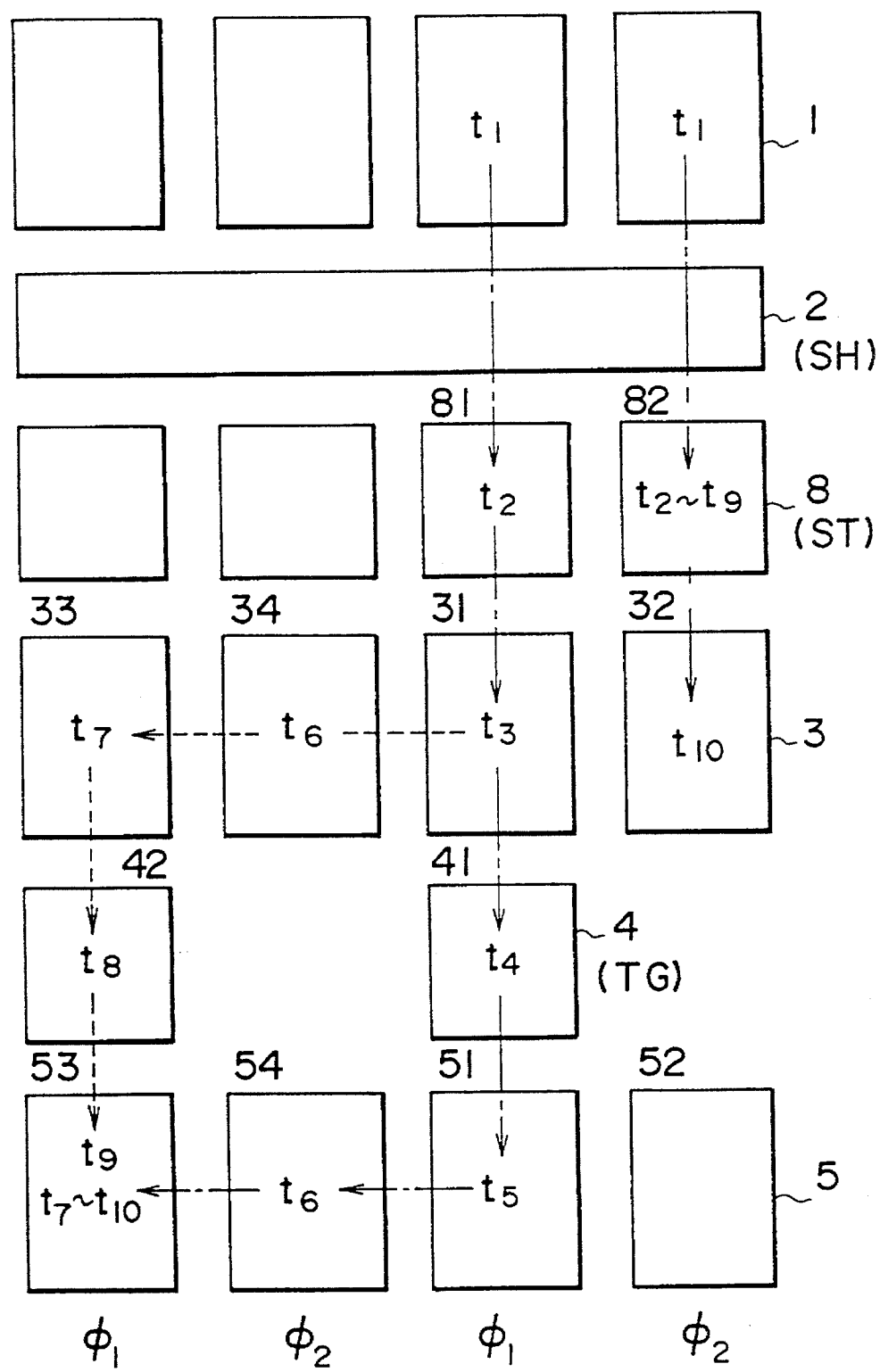
F I G. 7

(1)

(2)

(3)

(4)

(5)

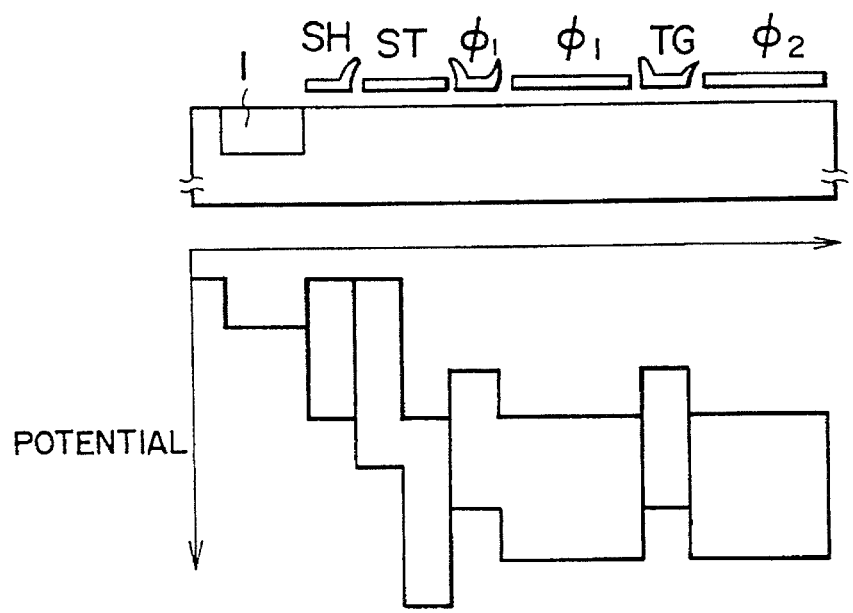
F I G. 18
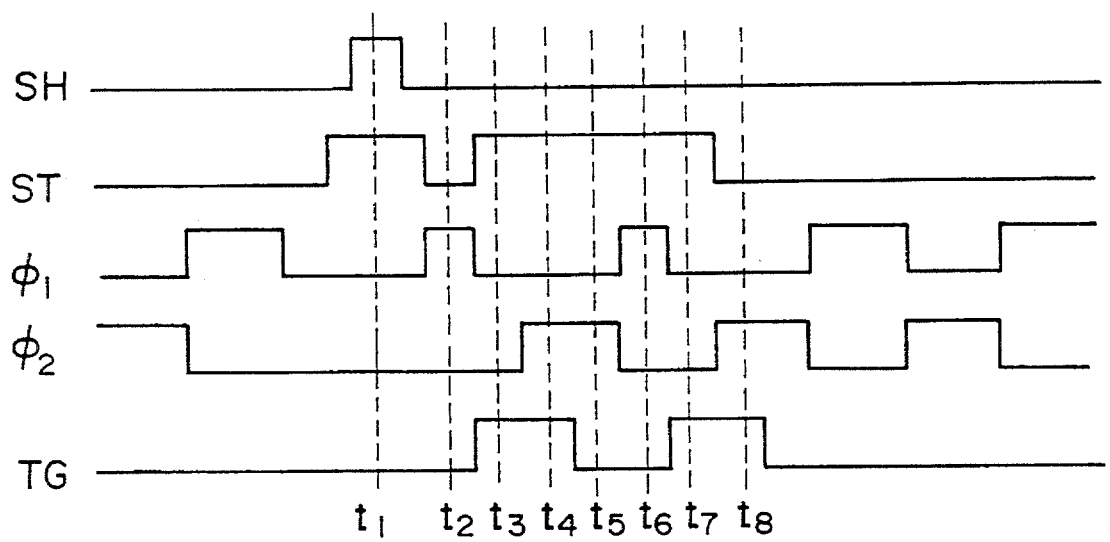
F I G. 19

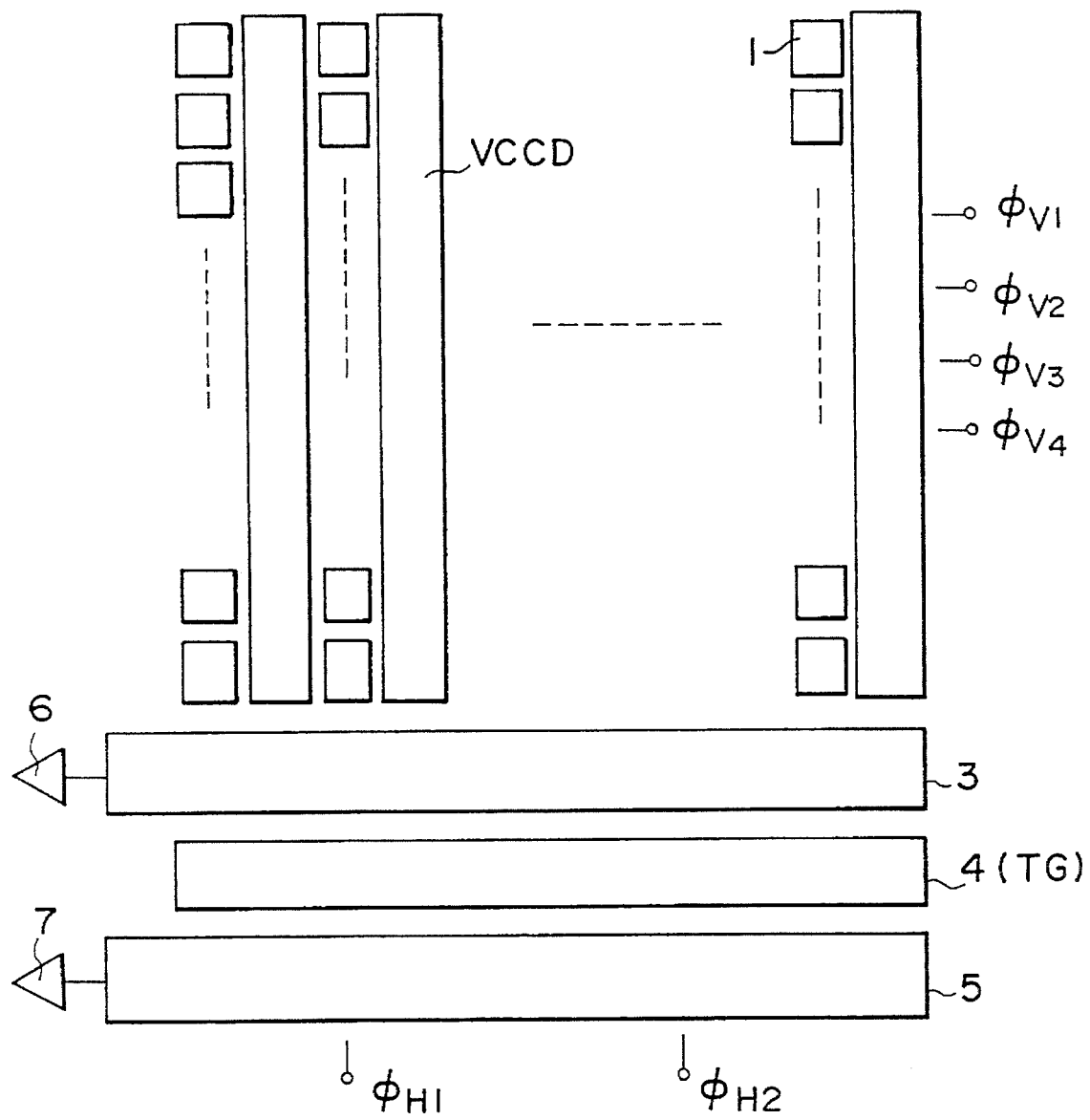
F I G. 30

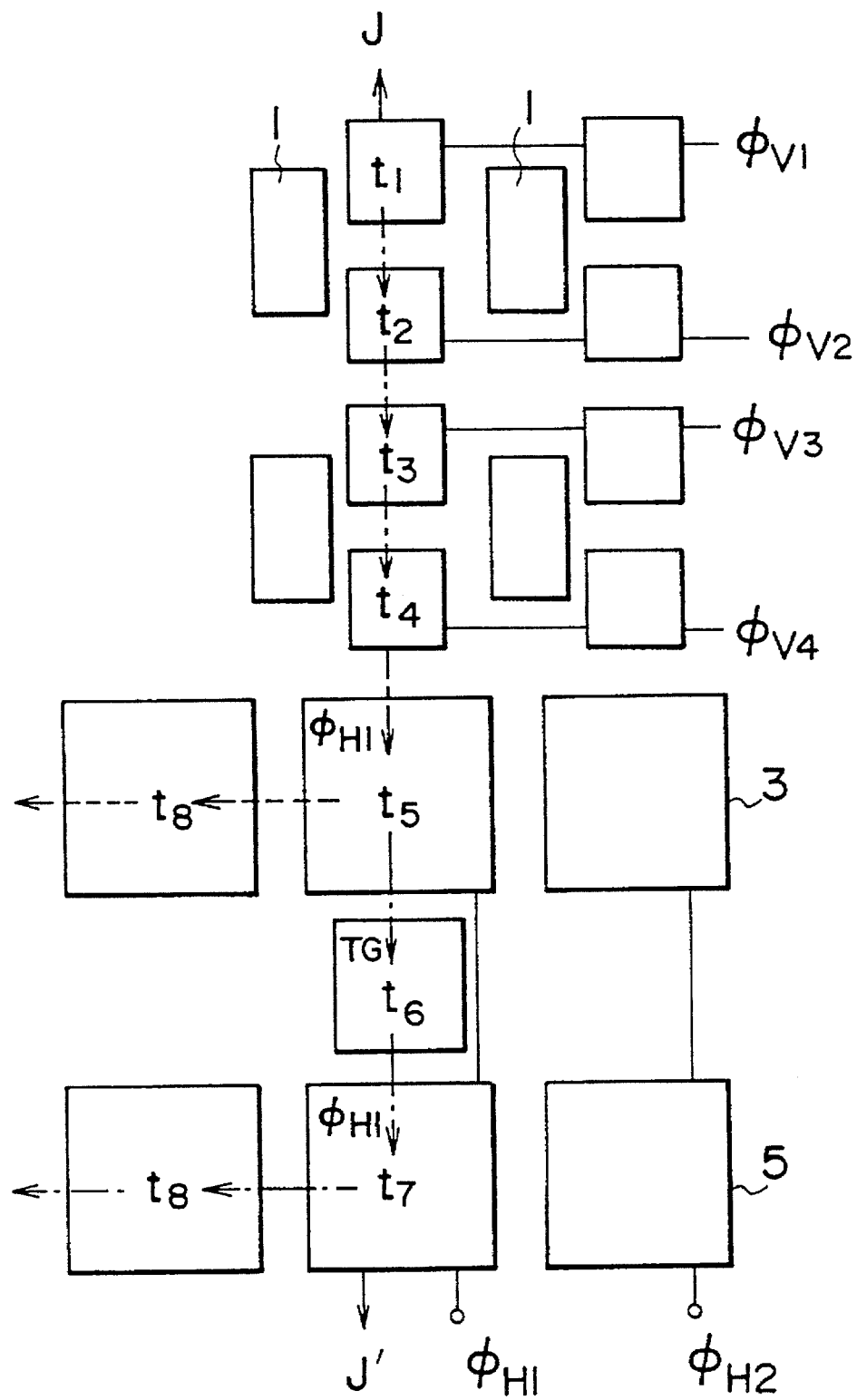
F I G. 31

METHOD FOR TRANSFERRING CHARGE, CHARGE TRANSFER DEVICE AND SOLID STATE IMAGE SENSING DEVICE USING THE SAME

BACKGROUND OF THE INVENTION

1. Field of the Invention

The present invention relates to a method for transferring charge and a charge transfer device, and more specifically to a multiline reading CCD (charge coupled device) register for reading signals from pixels (picture elements) arranged at fine pitches (intervals). In addition, the present invention relates to a solid-state image sensing device including the same charge transfer device.

2. Description of the Prior Art

The charge transfer device such as the CCD register is now widely used as signal charge transfer sections for the solid-state image sensing device. In particular, the multiline reading CCD register has become important more and more, because of its adaptability to a high resolution image sensor of fine pitch.

A conventional structure of a charge transfer device will be described hereinbelow by taking the case of a CCD linear image sensor using the multiline reading CCD register.

FIG. 1 is a plan view showing an example of the conventional CCD linear image sensor formed on a semiconductor substrate. In the drawing, there is shown a two-line reading CCD register, by which signal charges generated by pixels 1 arranged in a row (i.e. a photoelectric conversion section) are read by two CCD registers 3 and 5. A shift gate 2 is disposed so as to correspond to all the pixels, and transfer gates 4 are arranged alternately along a row of the pixels 1 so as to correspond to every other pixel. When predetermined driving pulses are applied to respective transfer electrodes of the respective sections, signal charges are transferred from the pixels 1 of odd numbers to the outer CCD register 5 and from the pixels 1 of even numbers to the inner CCD register 3, as shown by dashed arrows in FIG. 1. The transferred charges are outputted to the outside through output buffers 6 and 7, respectively.

In the structure as described above, since twice the number of signal charges can be transferred by the use of the two CCD registers of the same pitch, it is possible to arrange the pixels at double the pitch. In other words, in the linear image sensor using the multiline reading CCD register, it is possible to increase the pixel density in an arrangement.

FIGS. 2 and 3 are cross-sectional views showing the CCD linear image sensor, taken along the lines A—A' and B—B' both shown in FIG. 1. In FIGS. 2 and 3, a potential distribution diagram is also shown, respectively. Further, FIG. 4 is an enlarged view showing the essential portions of the solid-state image sensing device of the CCD linear image sensor. Further, FIG. 5 is a drive timing chart between the transfer times t1 and t5, during which a predetermined signal charge is transferred in the CCD linear image sensor.

The shift gate 2 and the transfer gate 4 are connected to exclusive drive pulse wires SH and TG, respectively, and drive pulse wires $\Phi 1$ and $\Phi 2$ are connected to the transfer electrodes of the CCD registers 3 and 5 alternately. For example, as shown in FIG. 4, the drive pulse wire $\Phi 1$ is connected to the transfer electrodes at the cross section taken along the line A—A' shown in FIG. 1, and the drive pulse wire $\Phi 2$ is connected to the transfer electrodes at the cross section taken along the line B—B' shown in FIG. 1.

First, at the time t1, the signal charges are stored in the pixels 1. At the succeeding time t2, a pulse voltage is applied to the shift gate 2 to open the gate, so that the signal charges are transferred from the pixels 1 to the shift gate 2. Thereafter, at the time t3, the transferred signal charges are shifted to the CCD registers 31 and 32, respectively. Further, at the time t4, only the signal charge in the CCD register 31 is shifted to the transfer gate 4, and further to the CCD register 51 at the time t5. After that, the signal charges are transferred within the CCD by two-phase pulses and then outputted to the outside.

The problem involved in the conventional multiline reading CCD register is that the signal charges remain without being transferred during the transfer operation between the registers. In case the signal charges remain without being transferred, vertical strips appear on the display plane, so that the picture quality is deteriorated markedly. In addition, in case only one bit remains in one line, the IC is defective, thus resulting in the cause of a drop in IC production yield.

The reason why the charges remain is that the channel width is narrowed at the output side of the first register so that the barrier is produced due to the narrow channel effect or the charges remain in the channel due to contamination. Although these problems have been solved to some extent by improving the pattern design and the manufacturing process of the charge transfer device, it is extremely difficult to perfectly eliminate the remaining charges in the line. In addition, since the quantity of charges to be processed decreases with increasing sensitivity of the image sensing device and also the number of signals increases with increasing number of pixels, there exists a problem in that the probability of occurrence of the remaining charges increases.

SUMMARY OF THE INVENTION

Accordingly, the object of the present invention is to provide a method of transferring charge which can reduce the amount of remaining charges during the charge transfer operation for improvement of picture quality.

Another object of the present invention is to provide a charge transfer device which can realize the method of transferring charges.

Still further object of the present invention is to provide a solid-state image sensing device including the above-mentioned charge transfer device.

According to a first aspect of the present invention, there is provided a method of transferring charges generated by signal charge generating sections, through a plurality of transfer electrodes of a plurality of charge transfer sections arranged in parallel to each other, comprising the steps of:

transferring a signal charge existing under some transfer electrode of the plural charge transfer sections, through one of a plurality of connecting sections formed under the transfer electrode corresponding to another charge transfer section among the plural connecting sections formed between the plural charge transfer sections, on the basis of a predetermined drive pulse; and when the charge is transferred to the other charge transfer section, transferring a charge remaining at the primary charge transfer section from the primary charge transfer section to the other charge transfer section, through the other connecting section among the plural connecting sections, to combine the remaining charge with the signal charge previously transferred.

According to a second aspect of the present invention, there is provided a charge transfer device, comprising:

a plurality of charge transfer sections arranged in parallel to each other and having a plurality of transfer electrodes, respectively for transferring signal charges generated by signal charge generating sections;

a plurality of connecting sections formed between said plural transfer sections, for transferring a signal charge existing under some transfer electrode of said plural charge transfer sections to under another transfer electrode corresponding to the other charge transfer section on the basis of a drive pulse; and means for combining a charge remaining at the primary charge transfer section with the signal charge previously transferred, when the charge is transferred to the other charge transfer section, by transferring the remaining charge from the primary charge transfer section to the other charge transfer section through the other connecting section among the plural connecting sections.

According to a third aspect of the present invention, there is provided a solid-state image sensing device, comprising: a signal charge generating section for generating signal charges in response to light allowed to be incident upon a semiconductor substrate; and above-mentioned charge transfer device.

According to the charge transfer device, the method of transferring charges, and the solid-state image sensing device using the same of the present invention, the remaining charges are transferred from the first charge transfer section to the second charge transfer section register after the remaining charges have been moved to other different transfer electrodes of the first charge transfer section. The above-mentioned transfer operation of the remaining charges is performed at least once. When performed plural times in sequence, since the remaining charges can be transferred between the charge transfer sections more perfectly, it is possible to reduce the remaining charges.

Further, an storage section is provided between the pixel and the first charge transfer section, in order to store the succeeding charge transferred to the first charge transfer section after the current charge has been transfer between the registers, during the current transfer operation between the registers, thus preventing the current charge from being mixed with the succeeding charge during the transfer operation between the charge transfer sections.

BRIEF DESCRIPTION OF THE DRAWINGS

In the attached drawings:

FIG. 7 is an enlarged plan view showing the charge transfer device shown in FIG. 6;

FIG. 18 is a cross-sectional view taken along the line E—E' shown in FIG. 17 and a potential distribution diagram thereof together;

FIG. 19 is a drive timing chart of the third embodiment of the present invention;

FIG. 30 is a plan view showing an eighth embodiment of the charge transfer device according to the present invention, in which the present invention is applied to an area sensor;

FIG. 31 is an enlarged plan view showing the eighth embodiment of the charge transfer device according to the present invention;

DETAILED DESCRIPTION OF THE PREFERRED EMBODIMENTS

The embodiments of the present invention will be described hereinbelow with reference to the attached drawings.

Figure 6:
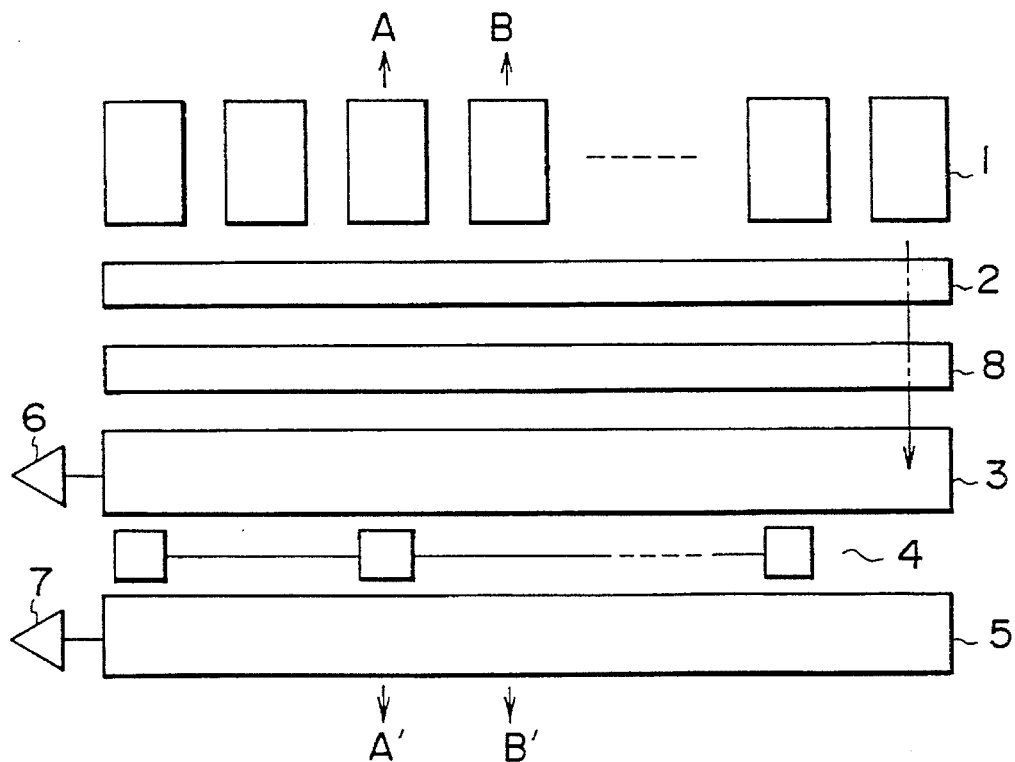
FIG. 6 is a plan view showing a first embodiment of the charge transfer device formed on a semiconductor substrate according to the present invention.

First, a first embodiment will be described with reference to FIGS. 6 to 12. FIG. 6 is a plan view showing a CCD linear image sensor including charge transfer sections 3 and 5 (e.g. CCD registers) formed on a p-type silicon semiconductor substrate. The linear image sensor shown in FIG. 6 is of two-line reading type, in which signal charges generated by a plurality of pixels 1 arranged in a row are read through two CCD registers 3 and 5. The shift gate 2 is provided for all the pixels, and the transfer gates 4 are arranged alternately along the row of the pixels 1.

When predetermined drive pulses are applied to respective electrodes of the shift gate 2 and the transfer gate 4, signal charges are transferred from the pixels 1 of odd numbers to the outer CCD register 5 and from the pixels 1 of even numbers to the inner CCD register 3, respectively as shown by dashed arrows in FIG. 7. Here. FIG. 7 is an enlarged plan view showing the essential portions of the charge transfer device shown in FIG. 6. Further, the transferred charges are outputted to the outside through output buffers 6 and 7, respectively.

In the structure as described above, since twice the number of signal charges can be transferred from the pixels to the outside with the use of two CCD registers of the same pitch, it is possible to arrange the pixels at double the pitch. As a result, in the linear image sensor using the multiline reading CCD register, it is possible to increase the pixel arrangement density. Further, in this embodiment, it should be noted that an storage section 8 composed of storage electrodes 81, 82, . . . is arranged additionally between the shift gate 2 and the first CCD register (first charge transfer section) 3.

Figure 8:
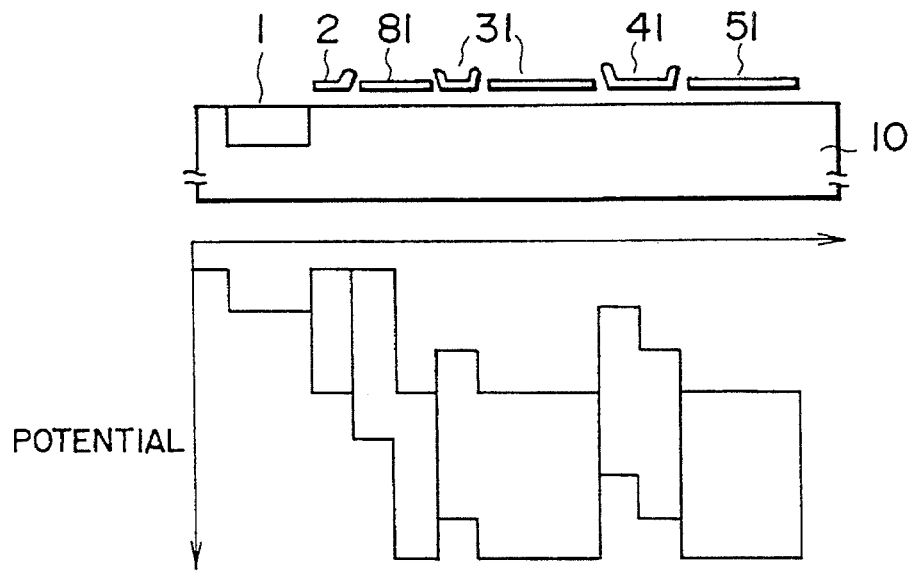
FIG. 8 is a cross-sectional view taken along the line A—A' shown in FIG. 6 and a potential distribution diagram thereof together.
Figure 9:
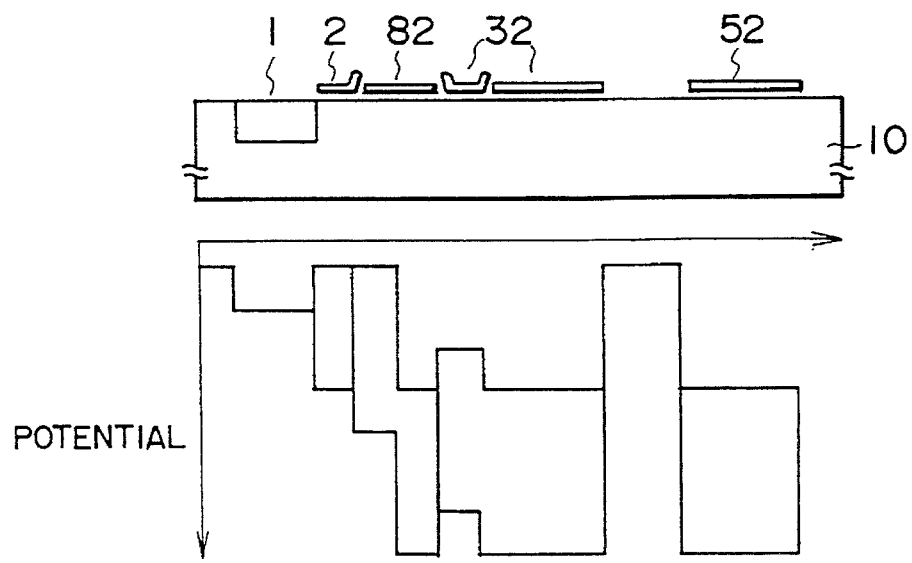
FIG. 9 is a cross-sectional view taken along the line B—B' shown in FIG. 6 and a potential distribution diagram thereof together.

FIGS. 8 and 9 are cross-sectional views taken along the lines A—A' and B—B' of the semiconductor substrate shown in FIG. 8, in which potential distribution diagrams at the same cross sections are also shown together, respectively.

Figure 10:
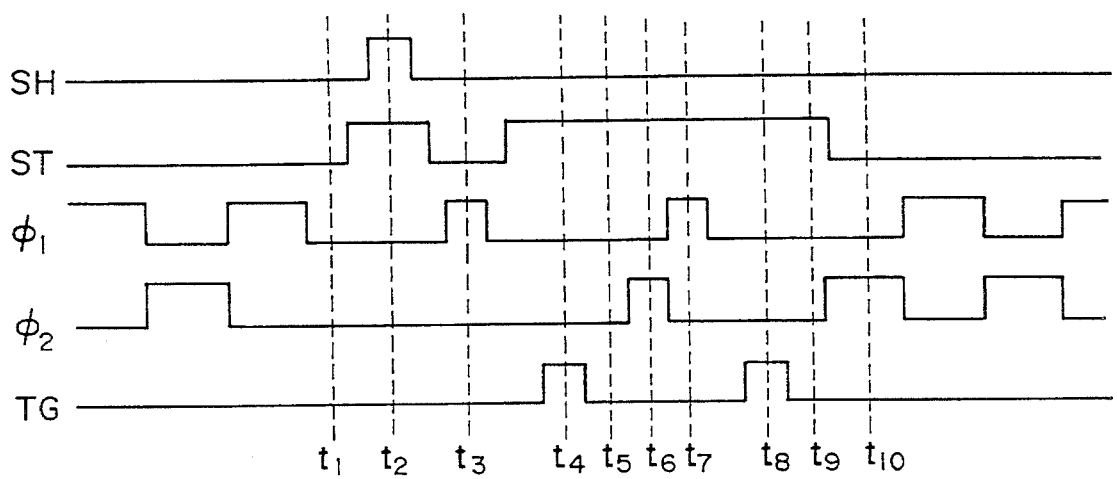
FIG. 10 is a drive timing chart of the first embodiment of the present invention.

Further, FIG. 10 is a drive timing chart between the transfer times t1 and t10 during which a precetermined signal charge of the CCD linear image sensor is transferred.

The shift gate 2, the storage section 8 and the transfer gate 4 are connected to exclusive drive pulse wires SH, ST and TG, respectively, and drive pulse wires Φ1 and Φ2 are connected to the transfer electrodes of the CCD registers 3 and 5 alternately. For example, with reference to FIGS. 6 and 7, the drive pulse wire Φ1 is connected to the transfer electrodes arranged at the cross section line A—A' shown in FIG. 6, and the drive pulse wire Φ2 is connected to the transfer electrodes arranged at the cross section line B—B' shown in FIG. 6.

Figure 1:
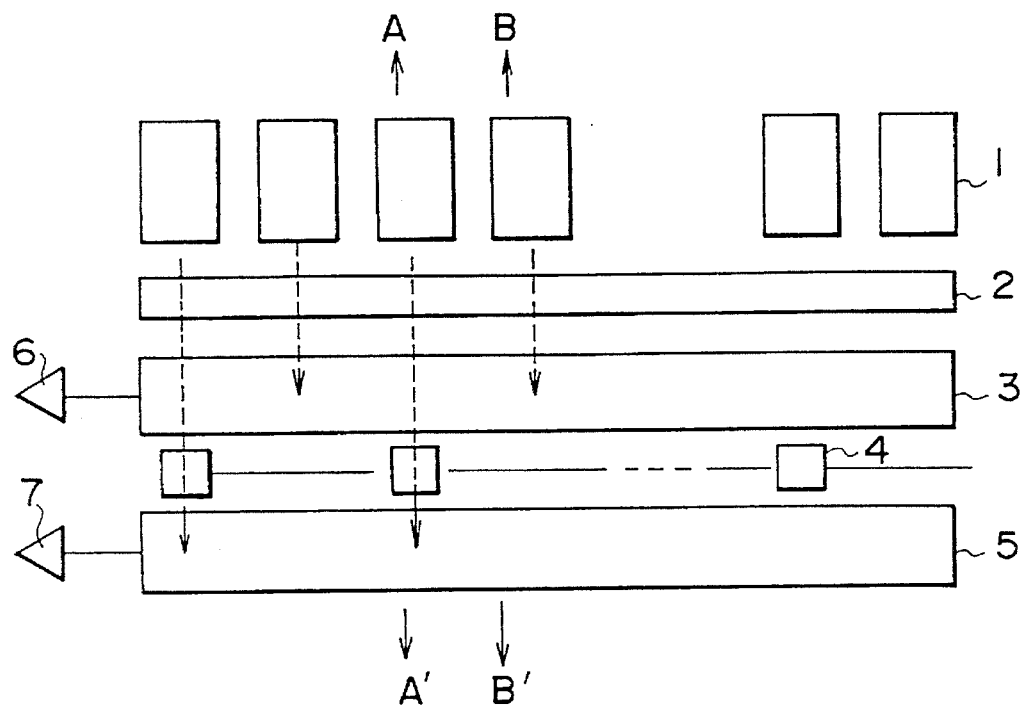
FIG. 1 is a plan view showing a prior art linear image sensor.
Figure 2:
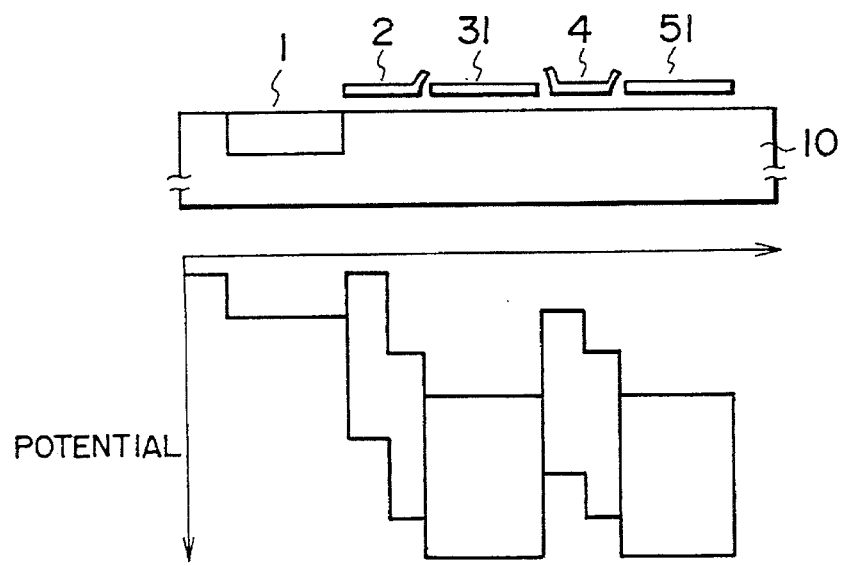
FIG. 2 is a cross-sectional view taken along the line A—A' shown in FIG. 1 and a potential distribution diagram thereof together.
Figure 3:
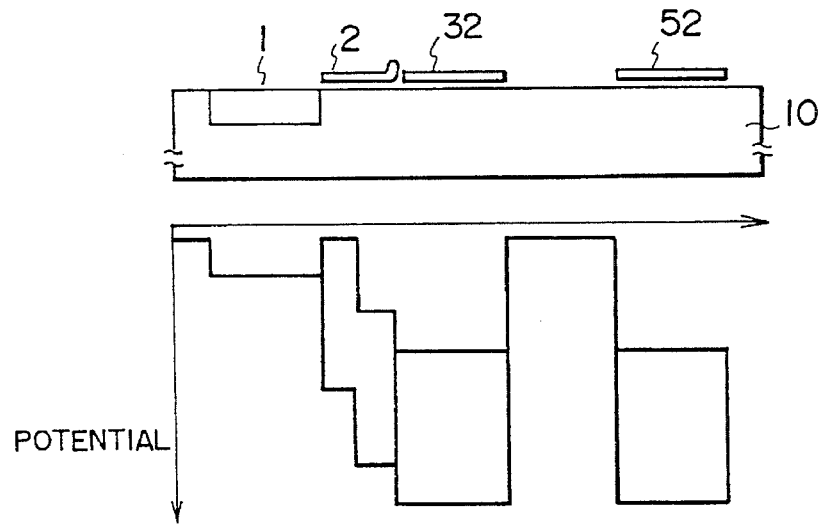
FIG. 3 is a cross-sectional view taken along the line B—B' shown in FIG. 1 and a potential distribution diagram thereof together.
Figure 4:
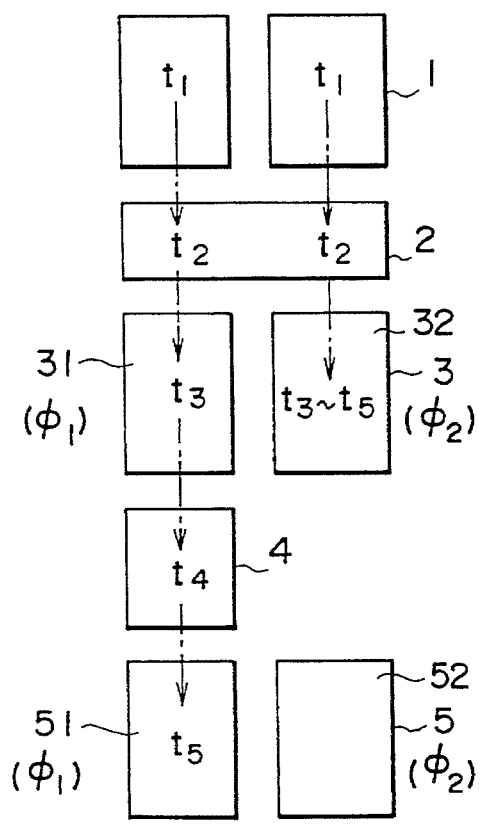
FIG. 4 is an enlarged plan view showing the essential portion of the linear image sensor shown in FIG. 1.
Figure 5:
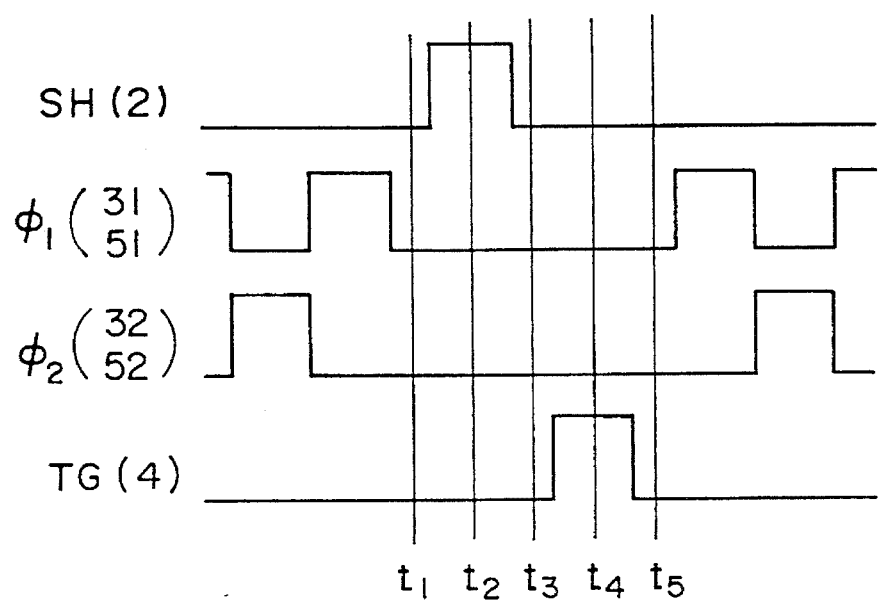
FIG. 5 is a timing chart showing the drive timing chart of the linear image sensor shown in FIG. 1.

The feature of this embodiment resides in the waveform of the drive pulses applied through the drive pulse wires Φ1 and Φ2. In more detail, in the case of the prior art CCD registers 3 and 5 as shown in FIG. 1, the drive pulses applied through the drive pulse wires Φ1 and Φ2 do not include any pulses between the times t1 and t5 during which one signal charge is transferred from the pixels 1 to the CCD registers 3 and 5, respectively as shown in FIG. 5. In the present invention, however, the drive pulses applied through the drive pulse wires Φ1 and Φ2 include some pulses generated at predetermined timings, between the times t1 and t10 during which one signal charge is transferred from the pixels 1 to the CCD registers 3 and 5, respectively, as shown in FIG. 10.

The above-mentioned additional pulses serve to transfer a remaining charge so that the remaining charge is combined with the charge now being transferred, in the case where part of the signal charge to be transferred remains. This operation will be described in further details hereinbelow.

At the time t1, a signal charge is generated in the pixel 1. At the succeeding time t2, the signal charge is shifted to the storage section 8 through the shift gate 2. At the time t3, only the signal charge at the storage electrode 81 is shifted to the transfer electrode 31 of the CCD register 3. Further, at the succeeding time t4, a pulse is applied to the pulse wire TG and thereby the signal charge is shifted to the transfer gate 4. At the time t5, since the pulse applied through the pulse wire TG is released, the signal charge is shifted to under the transfer electrode 51 of the CCD register 5 so that the first transfer between the two registers 3 and 5 ends. At the next times t6 and t7, the signal charge transferred under the transfer electrode 51 is further shifted to under the transfer electrode 53 through under the transfer electrode 54, and at the same time if any charge remains under the transfer electrode 31 of the CCD register 3, the remained charge is shifted to under the transfer electrode 33 through under the transfer electrode 34.

At the succeeding times t8 and t9, the second transfer operation between the two registers 3 and 5 is performed through the transfer gate electrode 42 to shift the remaining charge from the transfer electrode 33 of the CCD register 3 to the transfer electrode 53 of the CCD register 5 for combining the shifted remaining signal charge with the signal charge already shifted. Here, since a voltage is kept applied to the storage section 8 during the period between the times t4 and t8, the potential well is deep at this storage section 8 and therefore the charge at the storage electrode 82 is kept stored under the storage section 8, so that it is possible to prevent this charge from being mixed with the preceding signal charge.

Finally, at the time t10, the charge under the storage electrode 82 is shifted to under the transfer electrode 32, and further transferred within the CCD registers by the two phase clocks. As described above, it is possible to restore the remaining charge as the signal charge effectively.

In the case where the signal charge is required to be transferred repeatedly between the two registers, the same transfer operation between the times t6 and t8 is to be repeated.

In the structure as described above, since the same signal charge can be transferred several times between the registers through different electrodes, it is possible to reduce the possibility of occurrence of remaining charge markedly. Furthermore, where the storage section is provided between the pixels and the CCD resister, it is possible to further prevent the signal charge from being mixed with each other. Furthermore, since the one transfer time between the two registers is 1 μsec or less in usual, even if several transfer operations are repeated between the registers, the influence upon the total integration time is negligible.

In this embodiment, the operation in which signal charges are transferred to a neighboring transfer gate and then transferred to another charge transfer section is repeatedly performed. However, it is possible to repeatedly transfer to another charge transfer section at a far transfer gate by repeating charge transfer operation between times t5 to t7.

Figure 11:
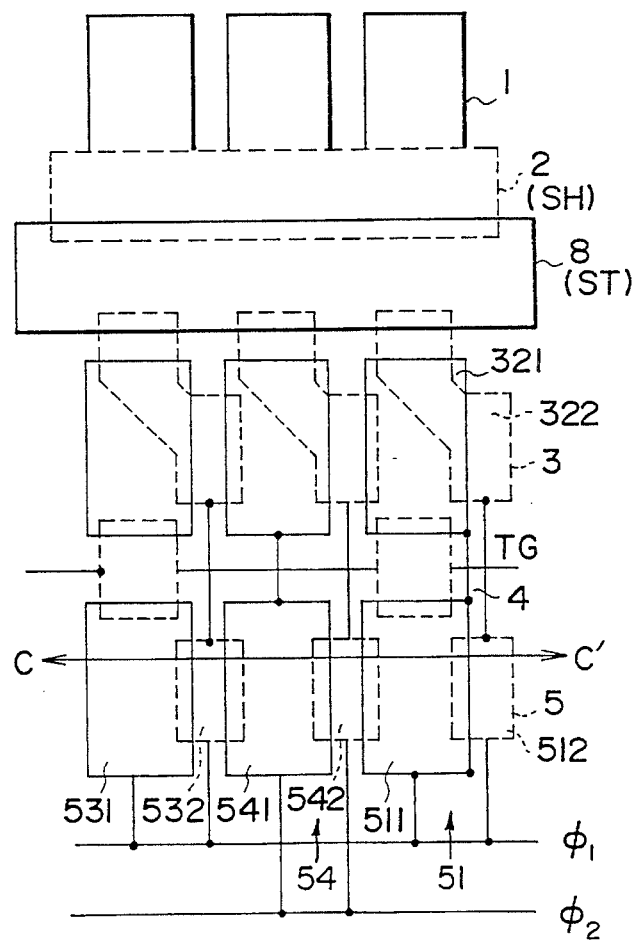
FIG. 11 is an enlarged plane view showing the electrode structure of the first embodiment of the charge transfer device according to the present invention.
Figure 12:
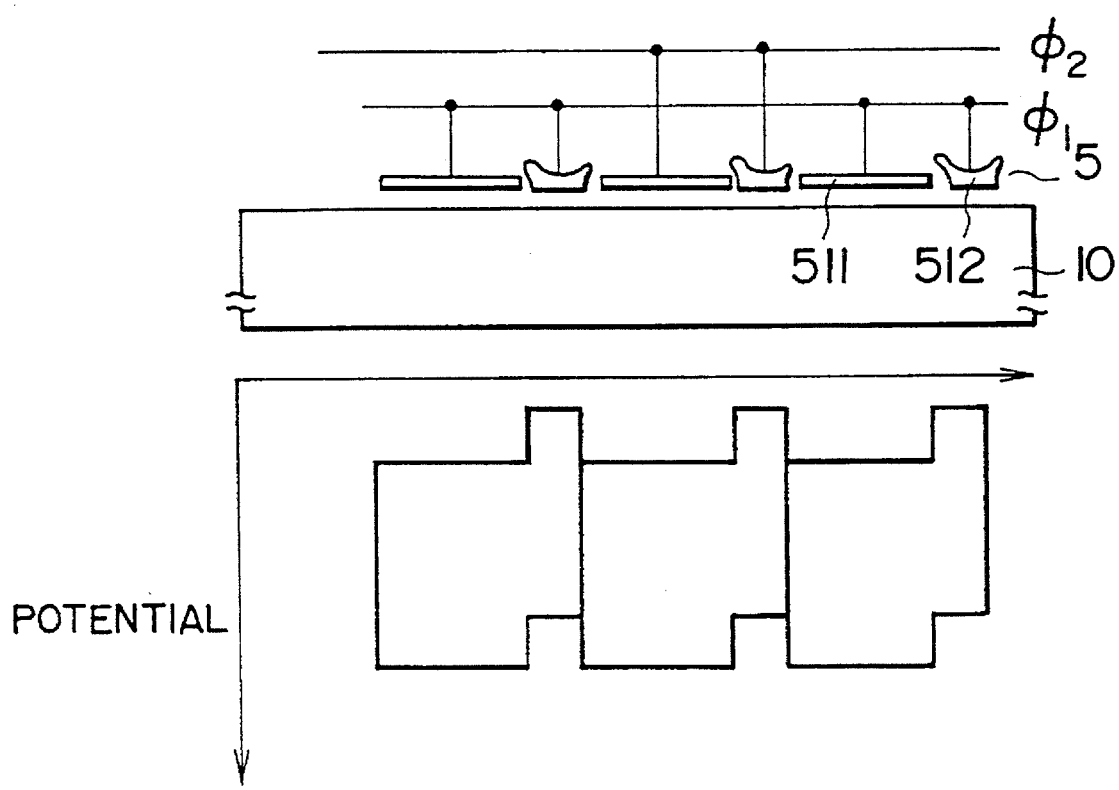
FIG. 12 is a cross-sectional view taken along the line C—C' shown in FIG. 11 and a potential distribution diagram thereof together.

The structure of the transfer electrodes of the charge transfer sections (CCD registers) 3 and 5 of this embodiment will be described in detail with reference to FIG. 11. FIG. 11 is an enlarged plan view showing the charge transfer device formed on a semiconductor substrate 10, and FIG. 12 is a cross-sectional view showing the charge transfer section (CCD register) 5, taken along the line C—C' shown in FIG. 11. As understood by these drawings, each transfer electrode is composed of a pair of electrodes. The respective electrodes are connected to the drive pulse wires Φ1 and Φ2 alternately to transfer signal charges within the charge transfer section through the drive pulse wires. For instance, the transfer electrode 51 of the charge transfer section 5 is composed of two electrodes 511 and 512 of different potential, both being connected to the drive pulse wire Φ1. On the other hand, the transfer electrode 54 is composed of two electrodes 541 and 542, both being connected to the drive pulse wire Φ2.

The second embodiment of the present invention will be described hereinbelow with reference to FIGS. 13 to 16. Here, in the same way as in the first embodiment, a two-line reading CCD linear image sensor including the CCD registers is formed on a silicon semiconductor substrate 10.

Figure 13:
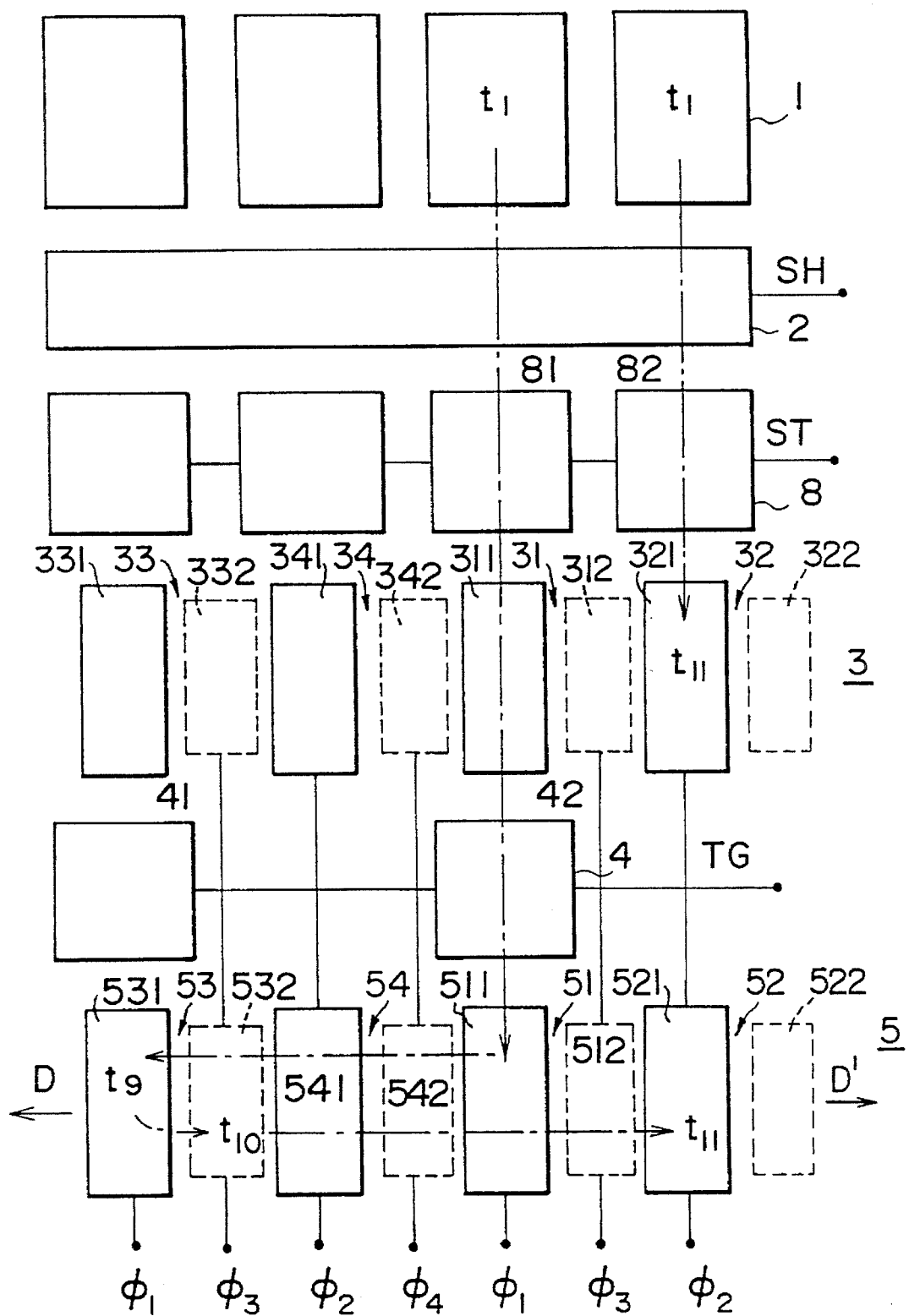
FIG. 13 is an enlarged plan view showing a second embodiment of the charge transfer device according to the present invention.

FIG. 13 is a plan view showing the essential portion of the image sensor formed on the semiconductor substrate 10. The image sensor comprises a pixel section 1, a shift gate 2, a first CCD register 3, a transfer section 4, a second CCD register 5 and a storage section 8, in the same way as in the first embodiment.

In the first embodiment, as shown in FIG. 7, the charge transfer sections 3 and 5 each composed of a plurality of transfer electrodes arranged so as to construct the first and second CCD registers are arranged in two lines; the transfer electrodes of the predetermined columns of these two CCD registers 3 and 5 are connected by the drive pulse wires so as to form a single transfer stage; the drive pulse wires for constituting a plurality of the transfer stages are arranged alternately by two different pulse patterns; and the signal charges within the respective CCC registers are transferred in response to the two phase clocks.

In comparison with the first embodiment, in this second embodiment, the transfer electrodes of the respective CCD registers 3 and 5 are provided with two-split subelectrodes, respectively. For instance, the transfer electrodes 31, 32 34 and 33 of the CCD register 3 are composed of electrodes 311 and 312, 321 and 322, 341 and 342, and 331 and 332, respectively. Further, the transfer electrodes 51, 52, 54 and 53 of the CCD register 5 are composed of electrodes 511 and 512, 521 and 522, 541 and 542, and 531 and 532, respectively. Further, drive pulse wires of different pulse patterns are connected alternately to the respective electrodes of these CCD registers. In more detail, a drive pulse wire Φ3 is connected to the electrodes 312 and 512, and a drive pulse wire Φ4 is connected to the electrodes 342 and 542, respectively.

Figure 14:
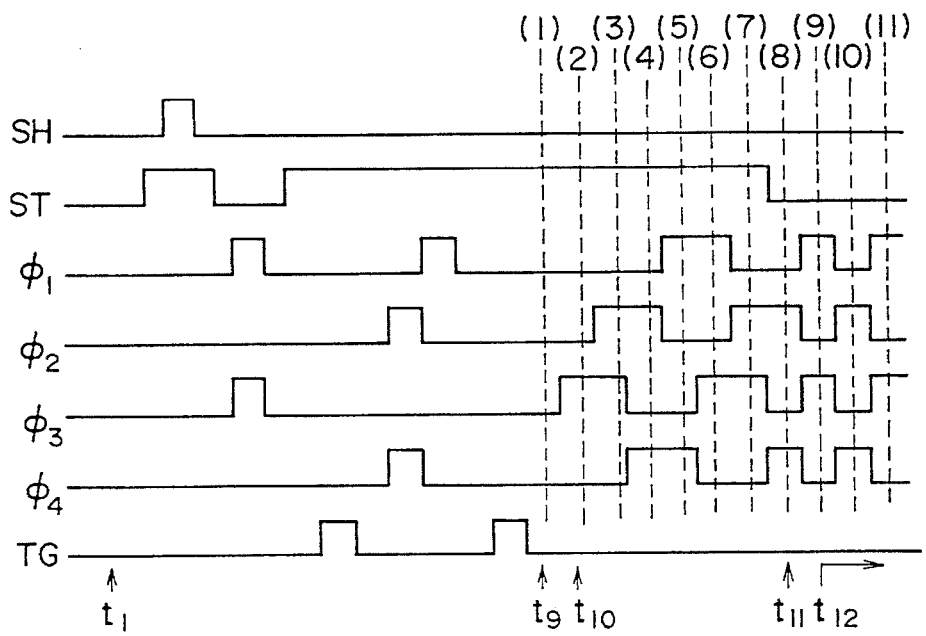
FIG. 14 is a drive timing chart of the second embodiment of the present invention.

FIG. 14 is a drive timing chart between the transfer times t1 and t12 during which a single signal charge is transferred forward and reversely.

The charge transfer operation between the two registers during the times between t1 and t9 is the same as in the first embodiment, and therefore the remaining charge is combined with the charge already transferred. Thereafter, during the period between the time t10 and t11, the signal charge is transferred reversely to the CCD register 5. At the time t11, the charge is transferred to the transfer electrode 52 of the CCD register 5. At and after t12, the respective signal charges are transferred within the CCD registers 3 and 5 toward the output section. When the signal charges are transferred as described above, since the signal charges are shifted in the CCD register 5 during the charge transfer operation between the two registers, there exists the case where the charge reading timing does not match each other between the two CCD registers 3 and 5. To overcome this problem, the following method is adopted in this embodiment.

Figure 15:
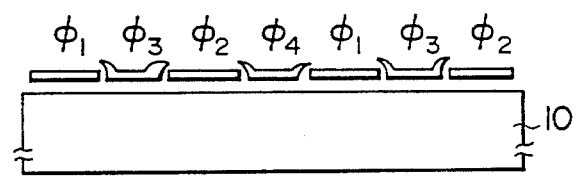
FIG. 15 is an illustration for assistance in explaining the charge transfer operation of the second embodiment according to the present invention.
Figure 15:
Figure 15:
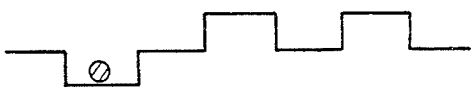
Figure 15:
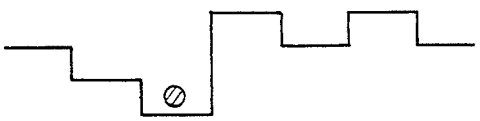
Figure 15:
Figure 15:
Figure 16:
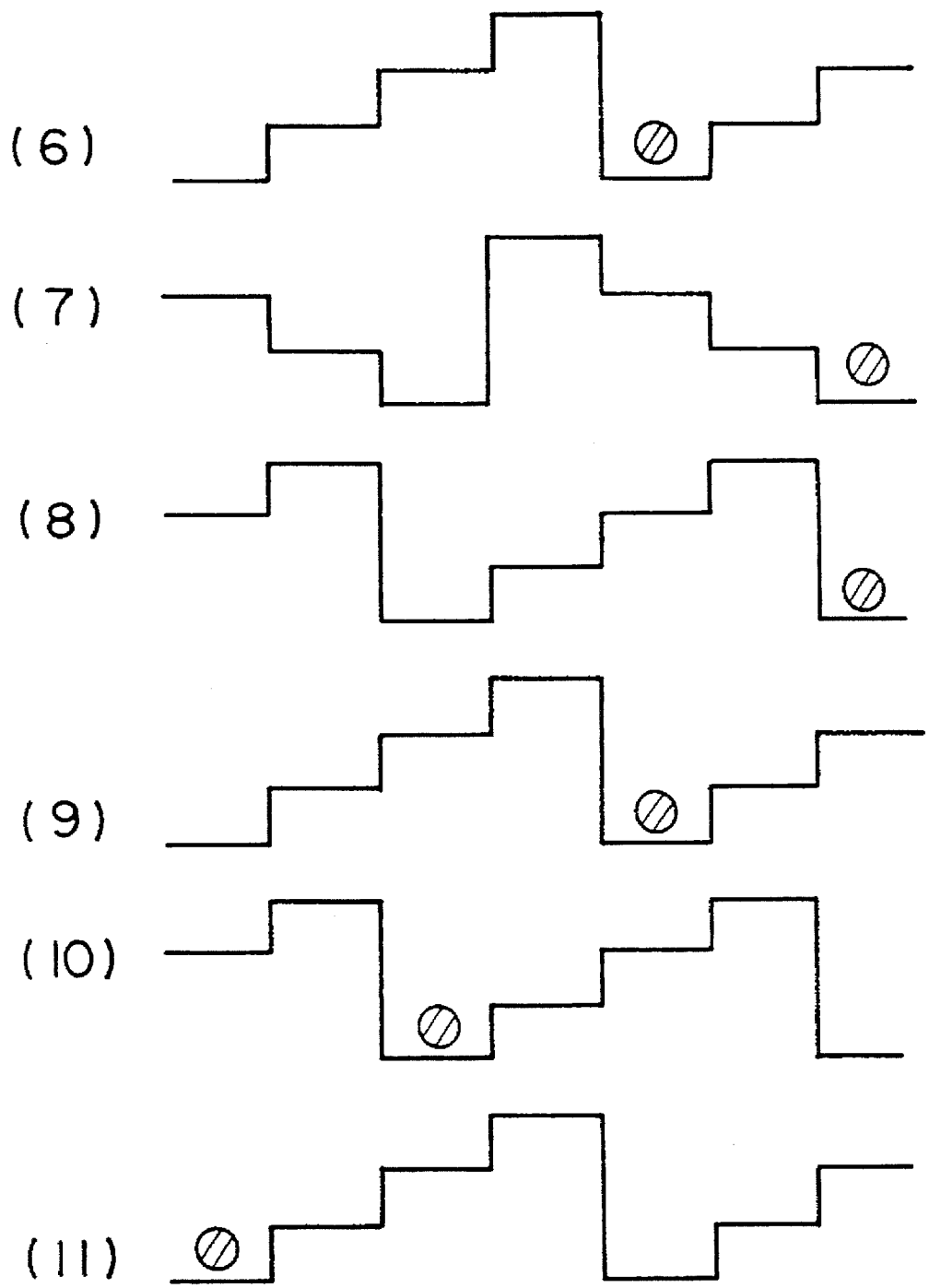
FIG. 16 is an illustration for assistance in explaining the charge transfer operation of the second embodiment according to the present invention in combination with FIG. 15.

Namely, in this second embodiment, the signal charge is transferred from the electrode 511 to the electrode 531 of the transfer electrode 51 of the charge transfer section 5, and further transferred reversely from the electrode 531 to the transfer electrode 52. The operation from the reverse transfer to the forward retransfer until being outputted is shown by the numerals (1) to (11) in FIG. 14. Further, the signal charge is transferred on the basis of the changes (shown by the numerals (1) to (11) in FIGS. 15 and 16) in potential distribution of the semiconductor substrate at the cross section taken along the line D—D' shown in FIG. 13. In FIGS. 15 and 16, the numerals (1) to (7) denote the reverse transfer operation; and the numerals (8) to (11) denote the ordinary forward transfer operation. In this second embodiment, although the charge transfer section 5 is of 4-phase structure, the charge can be transferred by 2-phase drive. The above-mentioned method is effective when the charges are transferred between the two registers repeatedly many times or through the transfer gates arranged far away from the registers. Further, in this embodiment, it is unnecessary to adjust the number of stages of the CCD registers.

As described above, in this embodiment, since the position and the time at which the charge transfer starts within the registers on the basis of the reverse transfer operation, it is possible to output the signals from both the CCD registers at the same time, so that the signal processing at the later stages can be more facilitated.

Figure 17:
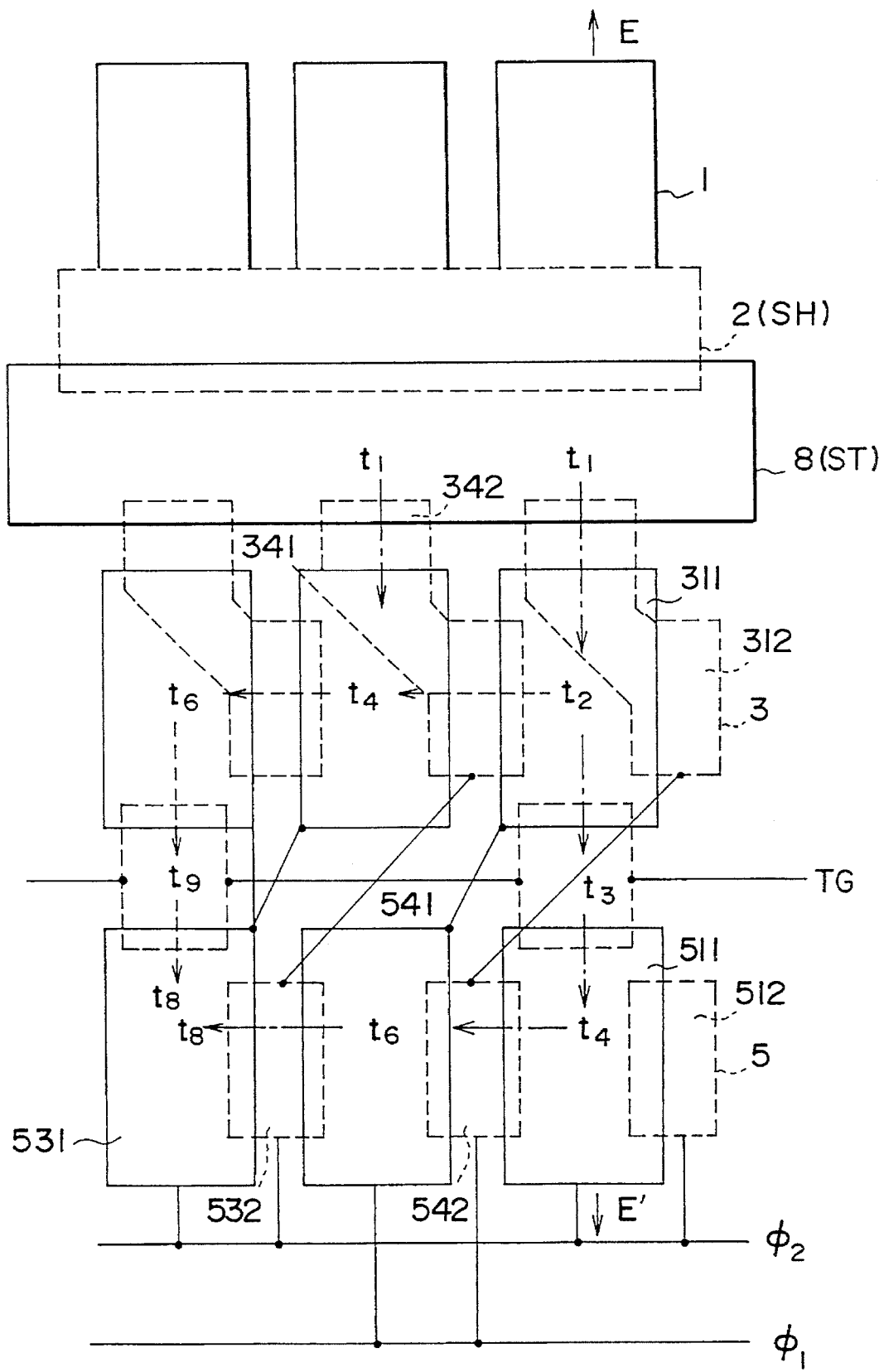
FIG. 17 is an enlarged plan view showing a third embodiment of the charge transfer device according to the present invention.

The third embodiment of the present invention will be described hereinbelow with reference to FIGS. 17 and 19. FIG. 17 is an enlarged plane view showing the charge transfer device, in which the charge transfer sections 3 and 5 are shown partially; FIG. 18 is a cross-sectional view taken along the line E—E' shown in FIG. 17 together with a potential distribution diagram; and FIG. 19 is a drive timing diagram thereof. In the first embodiment, the transfer electrodes of the inner charge transfer section 3 (i.e. the first CCD register) are connected to the corresponding transfer electrodes (arranged in the same column) of the outer charge transfer section 5 (i.e. the second CCD register) via the same drive pulse wire, as shown in FIG. 11. In this third embodiment, however, the transfer electrodes of the inner charge transfer section 3 are connected to the different transfer electrodes (arranged in the different columns) of the outer charge transfer section 5, as shown in FIG. 17. That is, the drive pulses applied to the inner and outer CCD registers 3 and 5 are out of phase with respect to each other. By changing the phases of the drive pulses as described above, it is possible to combine the remaining charge with the signal charge at the transfer electrodes of the charge transfer section 5 at the same timing. Therefore, the potential distribution under the transfer gate 4 can be simplified as shown in FIG. 18.

In the above-mentioned embodiments of the charge transfer device according to the present invention, the two CCD registers are shown. Without being limited thereto, it is of course possible to use three or more CCD registers. In the case of the solid-state image sensing device, if three or more CCD registers are used for instance, since the arrangement density of the pixels can be increased, it is possible to form the semiconductor integrated circuit at a higher integration rate. In the case of the three charge transfer sections (i.e. there CCD registers), two transfer gates are arranged between the two charge transfer sections, respectively. That is, in the above-mentioned embodiments, two pixels are arranged to one transfer gate. In this case, however, three pixels are arranged to one transfer gate.

Further, since it is necessary to shift the signal charge several times in order to combine the remaining charge with the signal charge, it is necessary to provide a sufficient number of packets by increasing the number of transfer stages at each charge transfer section more than that corresponding to all the signals.

Further, in the above-mentioned embodiments, two phase driving method is adopted as the method of driving the charge transfer device. Without being limited thereto, it is of course possible to adopt the three or four phase driving methods.

Figure 21:
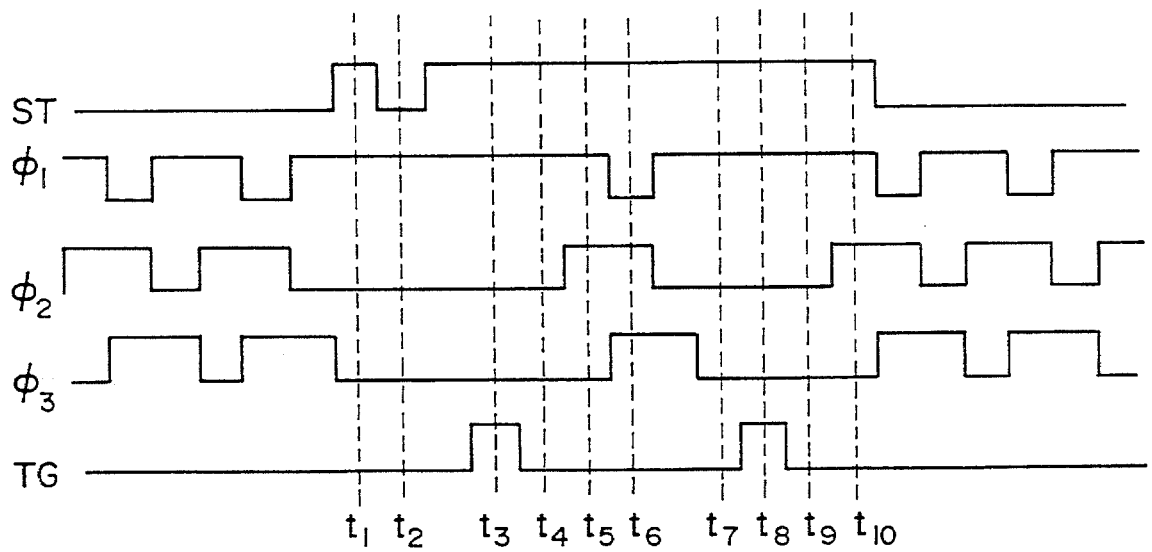
FIG. 21 is a drive timing chart of the fourth embodiment of the present invention.
Figure 22:
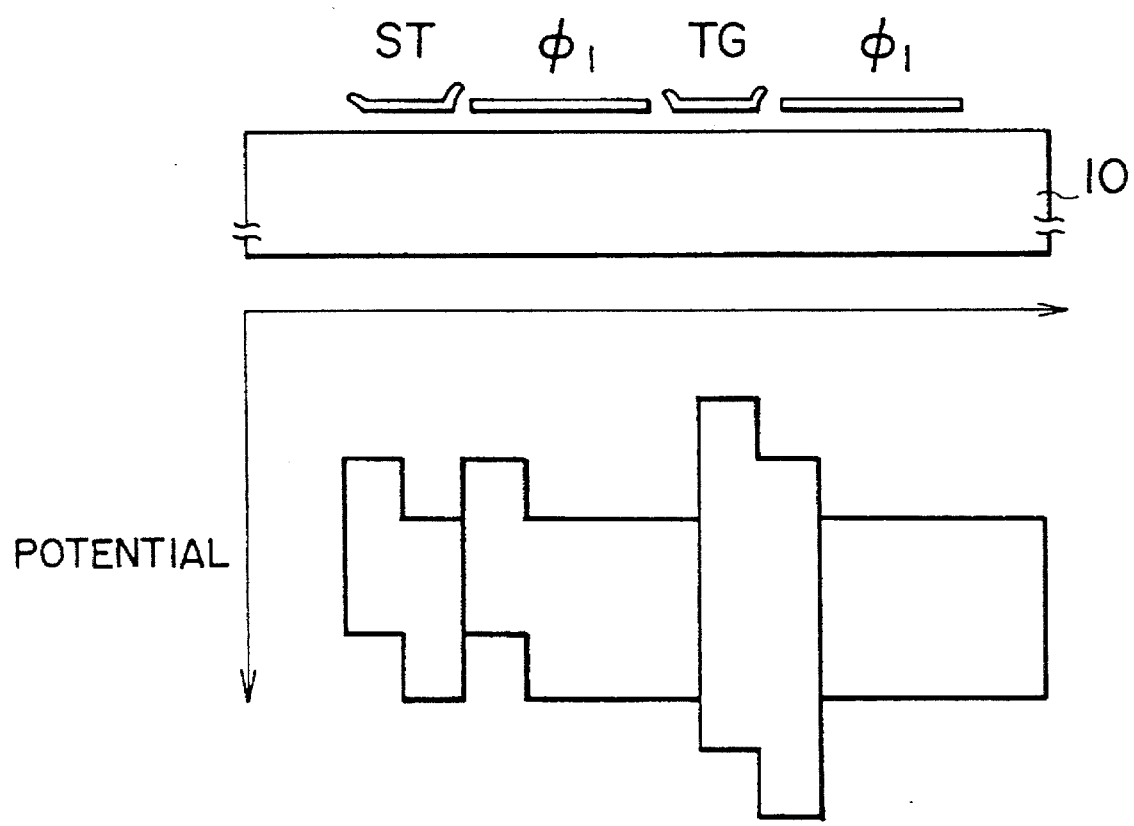
FIG. 22 is a cross-sectional view taken along the line F—F' shown in FIG. 20 and a potential distribution diagram thereof together.

The fourth embodiment of the present invention will be described hereinbelow with reference to FIGS. 20 to 22. In this embodiment, the charge transfer device is driven by three phase driving method.

Figure 20:
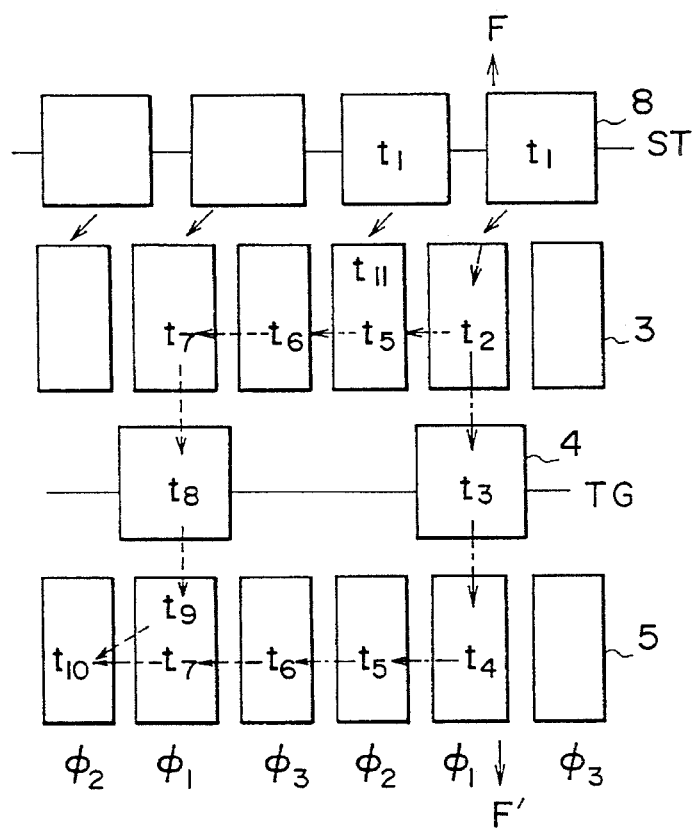
FIG. 20 is an enlarged plan view showing a fourth embodiment of the charge transfer device according to the present invention.

FIG. 20 is an enlarged plan view showing the charge transfer section formed on a semiconductor substrate 10. FIG. 22 is a cross-sectional view taken along the line F—F' shown in FIG. 20 together with a potential distribution diagram; and FIG. 21 is a drive timing diagram thereof. In this embodiment, when the signal charge is transferred, the remaining charge is transferred along another route and further the signal charge and the remaining charge are combined finally at the charge transfer section 5 in accordance with the potential distribution (as shown in FIG. 22) obtained by providing the drive pulse timing pattern (as shown in FIG. 21).

In the method as described above, it is possible to read the two pixels by use of three electrodes. In this method, however, the driving method is rather complicated.

Figure 24:
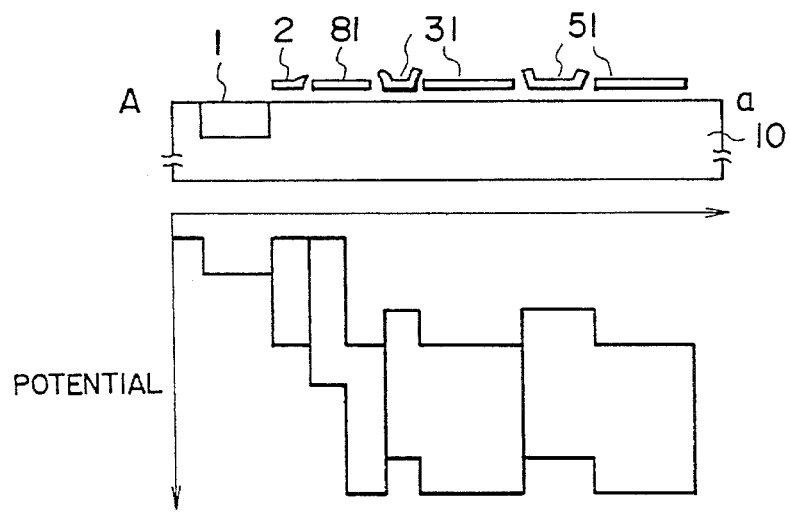
FIG. 24 is a cross-sectional view taken along the line G—G' shown in FIG. 23 and a potential distribution diagram thereof together.
Figure 25:
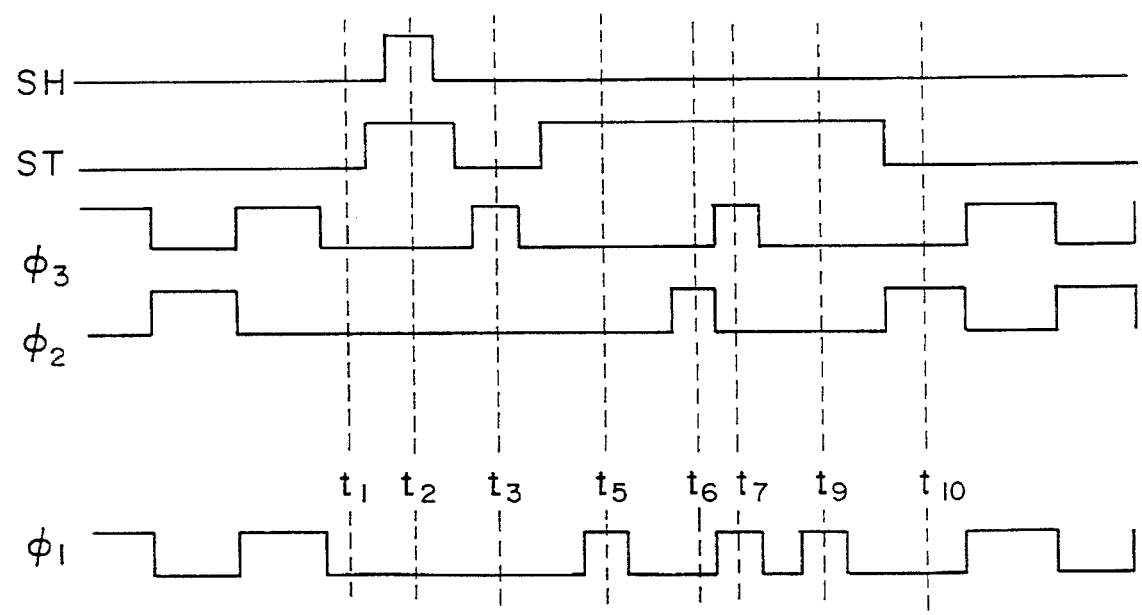
FIG. 25 is a drive timing chart of the fifth embodiment of the present invention.

The fifth embodiment of the present invention will be described with reference to FIGS. 23 to 25.

Figure 23:
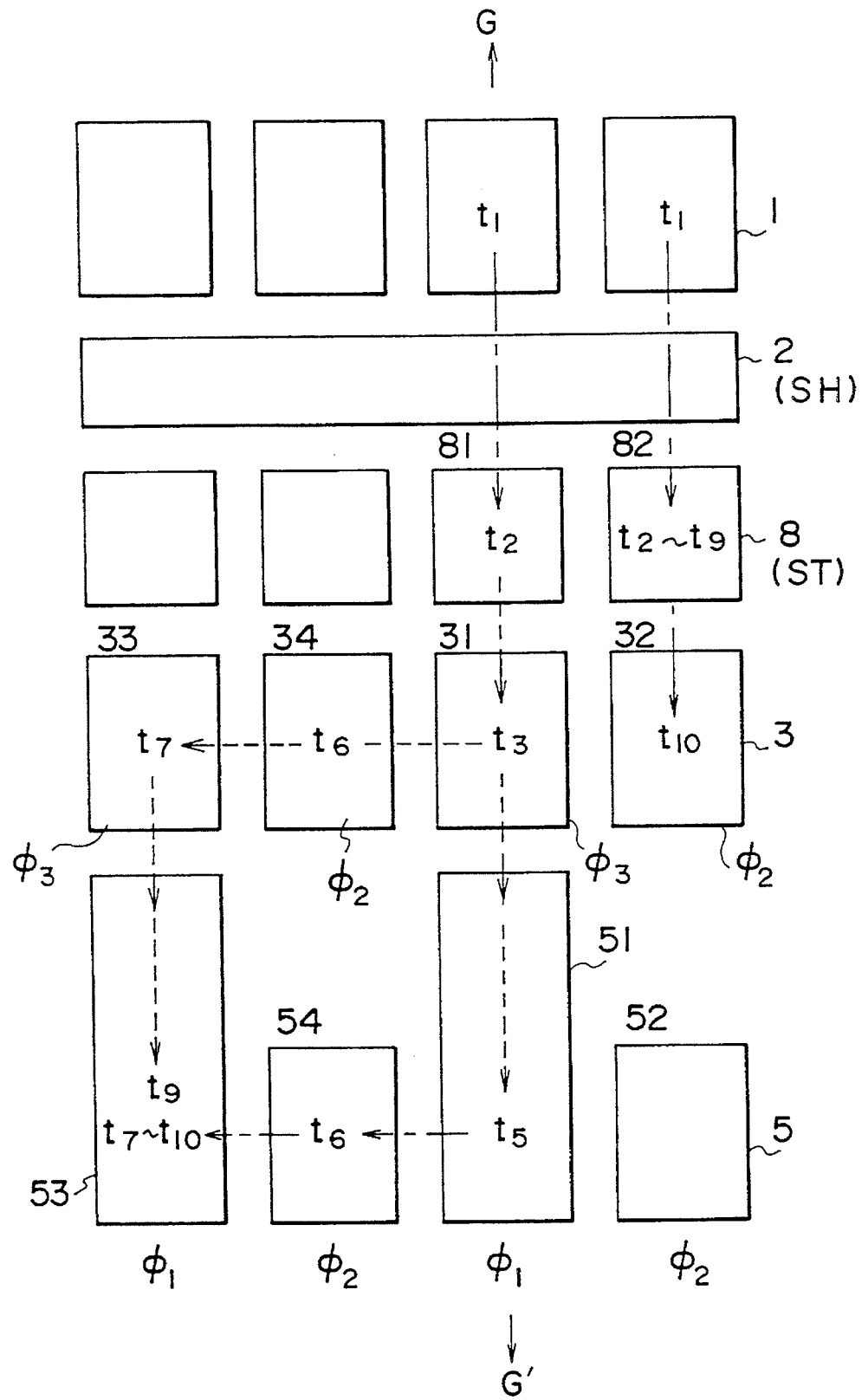
FIG. 23 is an enlarged plan view showing a fifth embodiment of the charge transfer device according to the present invention.

FIG. 23 is an enlarged plane view showing the charge transfer section formed on a semiconductor substrate 10. FIG. 24 is a cross-sectional view taken along the line G–G' shown in FIG. 23 together with a potential distribution diagram; and FIG. 25 is a drive timing diagram thereof.

The points different from the third embodiment shown in FIG. 7 are that the transfer gate 4 is omitted and further the CCD register 3 and the CCD register 5 are arranged in such a way as to be directly adjacent to each other alternately. In more detail, the length of the CCD registers 51 and 53 to which the drive pulse wire $\Phi 1$ is connected to longer than that of the CCD registers 52 and 54 to which the drive pulse wire $\Phi 2$ is connected. Further, the inner ends of the CCD registers 51 and 53 are adjacent to the outer ends of the CCD registers 31 and 33, respectively.

The operation of this fifth embodiment will be described with reference to FIGS. 23 to 25. At the time t1, a signal charge is stored at the pixel 1. At the time t2, the charge is shifted to the storage electrode 8 via the shift gate 2. At the time t3, only the charge under the storage electrode 81 is shifted to the CCD register 31. At the time t5, the first transfer between the two registers is made to shift the charge from the CCD register 31 to the CCD register 51.

At the times t6 and t7, the charge under the CCD register 51 and a remaining charge under the CCD register 31 are both shifted to the CCD registers 53 and 33, respectively. Further, at the time t9, the second transfer between the two registers is made. Since the potential is deep at the storage electrode 8 between the times t4 and t7, the charge under the storage electrode 8 is kept stored as it is. At the time t10 finally, the charge under the storage electrode 82 is shifter from the storage electrode 8 to the CCD register 32. Thereafter, the charge is transferred within the CCD registers by the two phase clocks.

As described above, it is possible to transfer the charges without arranging the transfer gate between the charge transfer sections (e.g. two CCD registers) 3 and 5.

In this fifth embodiment, if phases of drive pulses $\Phi 3$ and $\Phi 5$ are offset during charge transfer operation of transferring charges through the charge transfer sections 3 and 5, there may be a problem that charges under charge transfer sections 3 and 5 are mixed. To prevent this, if impurity concentrations under charge transfer sections 3 and 5 are made different or voltages of drive pulses $\Phi 3$ and $\Phi 5$ are made different during transfer of charges in order to make the depth of potential well under the charge transfer section 5 shallower than that of the charge transfer section 3, there will be no mixing of charges under the charge transfer sections 3 and 5.

Figure 27:
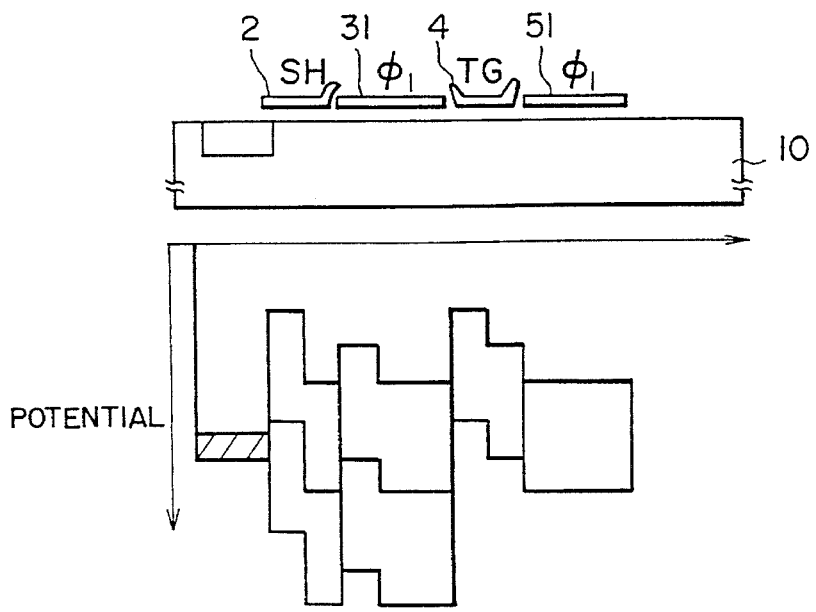
FIG. 27 is a cross-sectional view taken along the line H—H' shown in FIG. 26 and a potential distribution diagram thereof together.
Figure 28:
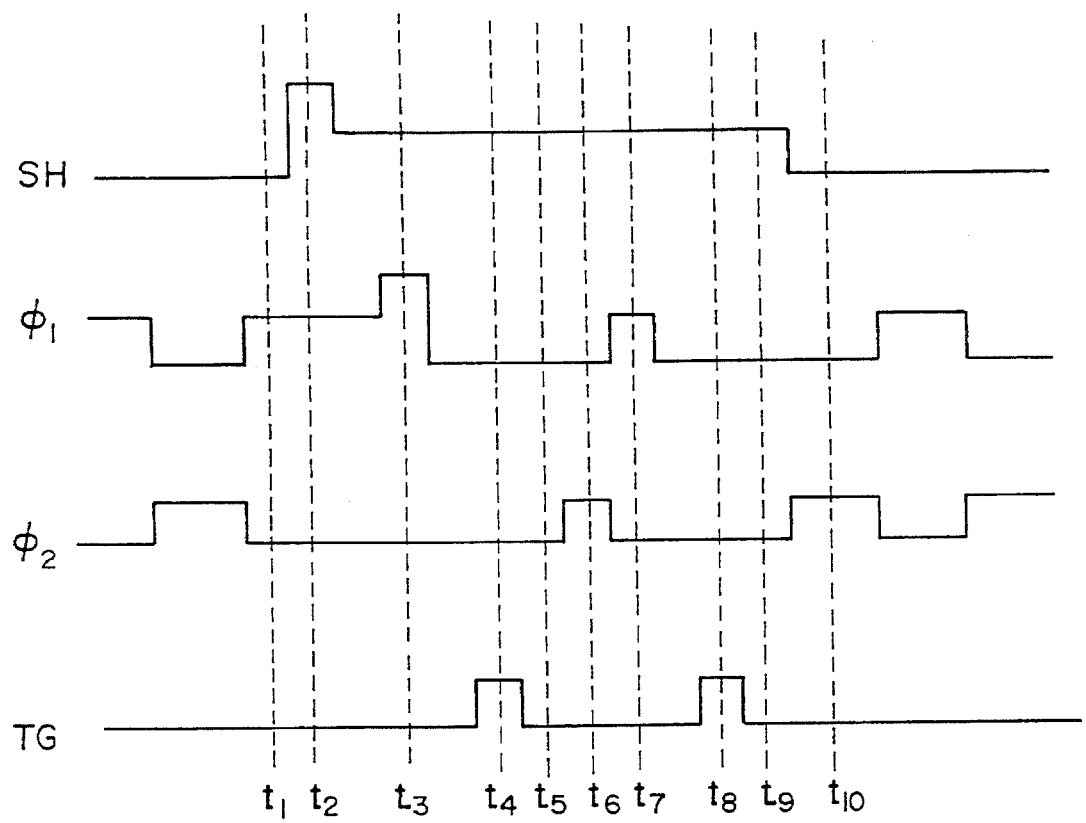
FIG. 28 is a drive timing chart of the sixth embodiment of the present invention.

The sixth embodiment of the present invention will be described with reference to FIGS. 26 to 28.

Figure 26:
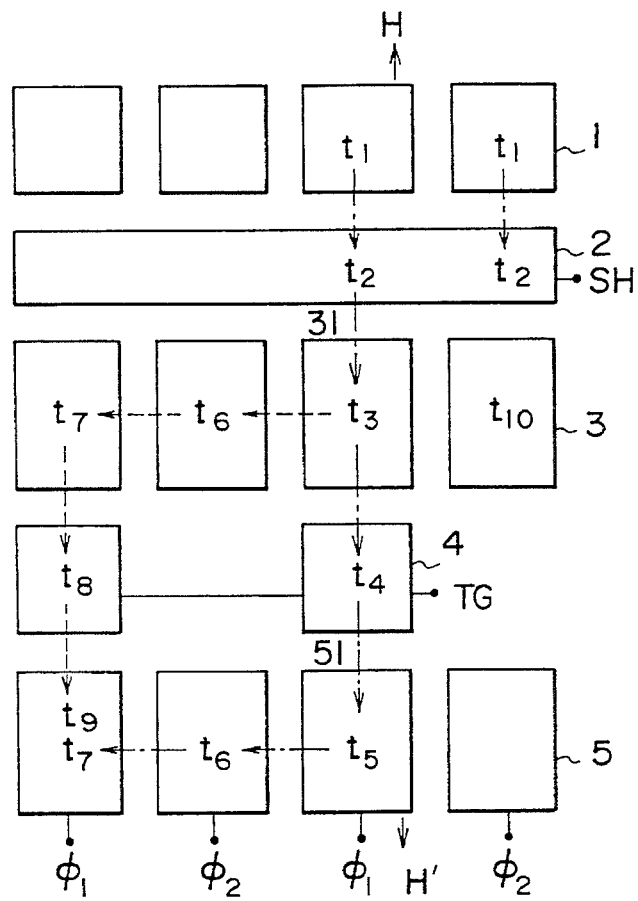
FIG. 26 is an enlarged plan view showing a sixth embodiment of the charge transfer device according to the present invention.

FIG. 26 is an enlarged plan view showing the charge transfer section formed on a semiconductor substrate 10. FIG. 27 is a cross-sectional view taken along the line H—H' shown in FIG. 26 together with a potential distribution diagram; and FIG. 28 is a drive timing diagram thereof.

The feature of this embodiment is to omit the storage section 8 (ST) for prevention of charge mixture. The potential distribution at the cross sectional portion H—H' of the charge transfer section formed on the semiconductor substrate as shown in FIG. 26 varies in accordance with the drive pulse timing pattern as shown in FIG. 28. Therefore, when the signal charge is transferred, the remaining charge is shifted via another route and further both are combined with each other finally at the charge transfer section 5. In this embodiment, the binary pulse voltage is replaced with a ternary pulse voltage for prevention of charge mixture, as shown in FIG. 28.

Figure 29:
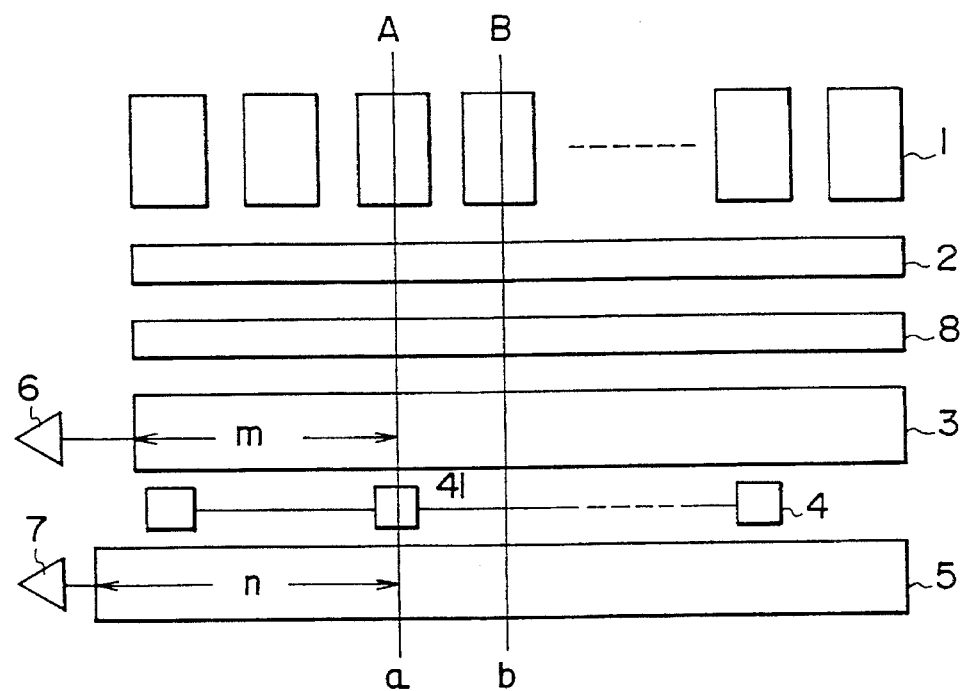
FIG. 29 is an enlarged plan view showing a seventh embodiment of the charge transfer device according to the present invention.

The seventh embodiment will be described with reference to FIG. 29. The feature of this embodiment is to provide a difference in the number of the transfer electrodes between the first charge transfer section (i.e. first CCD register) 3 and the second charge transfer section (i.e. second CCD register) 5. In this embodiment, since there exists a difference in the number of the transfer stages, it is possible to match the read timing of the first charge transfer section 3 with that of the second charge transfer section 5. For instance, when a charge is transferred from the first charge transfer section 3 to the second charge transfer section 5 through the transfer gate 41 as shown by the line A—a in FIG. 29, the number of the transfer stages (i.e. the number of electrodes) between the transfer gate 41 and the output side is determined to be m stages in the first charge transfer section 3 and to be n stages in the second charge transfer section 5. This is because when the numbers of the transfer stages of both the sections 3 and 5 are the same with respect to each other, there exists the case where the signal charge reading timing is different from each other. Therefore, it is possible to match the timings of both by appropriately changing the numbers of stages (m or n) of the transfer electrodes in both the sections 3 and 5.

The eighth embodiment of the present invention will be described with reference to FIGS. 30 to 33. The feature of this embodiment is to apply the charge transfer device to a two-dimensional area sensor.

In the case of the linear sensor, the pixels are arranged in a horizontal line. In the case of the area sensor, however, the pixels are arranged in two dimensional way so as to have a plurality of vertically arranged pixels. The charges are generated at the respective pixels arranged along the vertical columns. The generated charges are transferred from vertical CCDs (referred to as VCCDs, hereinafter) formed in parallel to each other along the vertical columns to the first charge transfer section 3, to the transfer gate 4, and further to the second charge transfer section 5. Further, the transferred charges are outputted to the outside through output buffers 6 and 7. In the transfer sections provided for the pixels, charges are driven by drive pulses of $\Phi V1$, $\Phi V2$, $\Phi V3$, and $\Phi V4$, respectively. In the charge transfer sections 3 and 5, charges are driven by drive pulses $\Phi H1$ and $\Phi H2$, respectively. Each of the charge transfer sections is composed of a horizontal CCD (referred to as HCCD, hereinafter). FIG. 30 shows the case of the interline transfer type area sensor. However, the structure of a frame transfer type area sensor is basically the same as that shown in FIG. 30.

Figure 32:
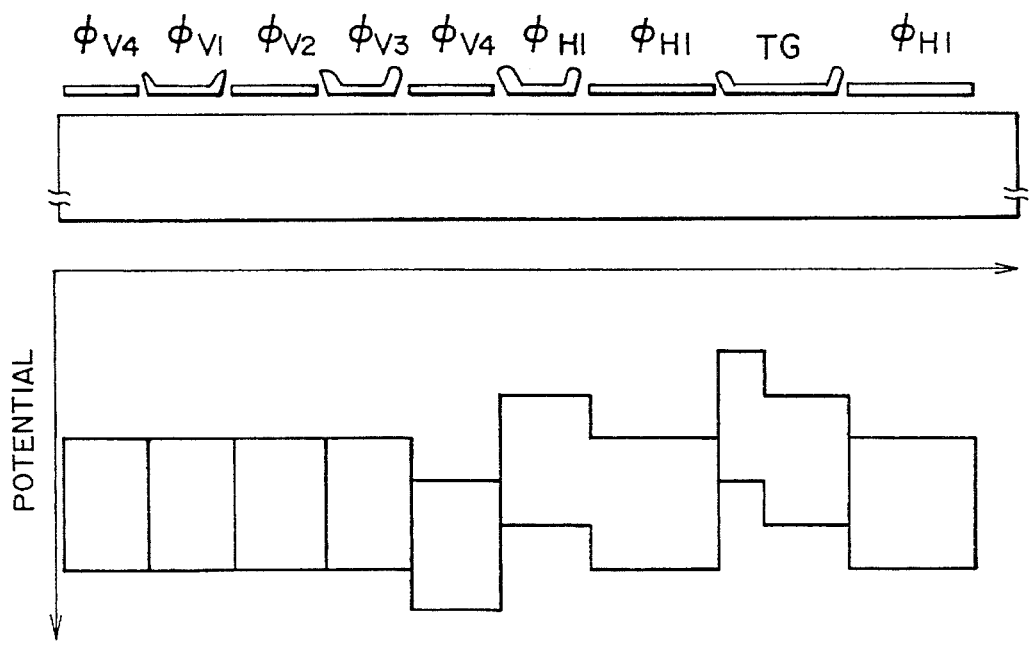
FIG. 32 is a cross-sectional view taken along the line H—H' shown in FIG. 29 and a potential distribution diagram thereof together.
Figure 33:
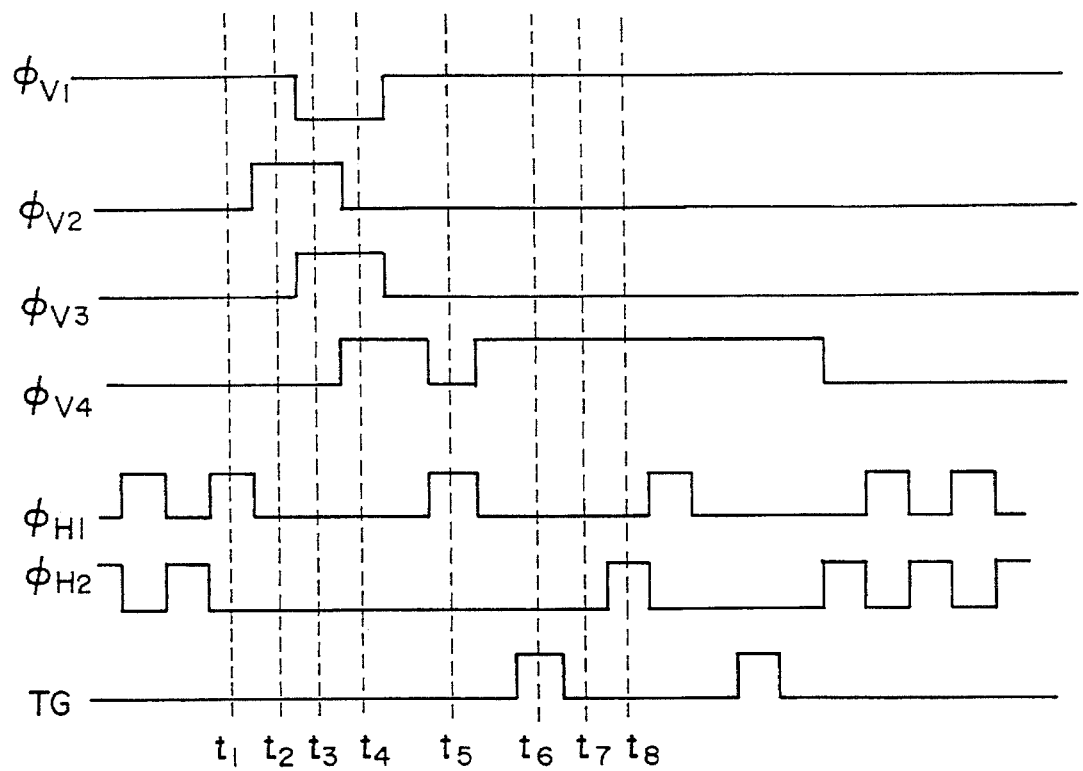
FIG. 33 is a drive timing chart of the eighth embodiment of the present invention.

FIG. 31 is an enlarged plan view showing partially the area sensor for assistance in explaining the transfer operation of signal charges. FIG. 32 is a cross-sectional view taken along the line J—J' shown in FIG. 31 together with a potential distribution diagram; and FIG. 33 is a drive timing diagram thereof. In accordance with the drive timing pattern, the signal charges are transferred through the transfer sections and combined with the remaining charge just before the output sections.

In addition to the method of storing the signal charges as explained already in relation to the above-mentioned embodiments, another method of storing the succeeding-line signal charge under the storage section (ST) or the shift gate (SH) at the connecting portion between the pixel and the charge transfer section will be described hereinbelow.

The one method is to divide the storage electrodes of the storage section 8 into two types, and further to control the respective electrodes independently for prevention of mixture between the signal charges. Alternatively, it is possible to divide the number of signals into a half and to combine the divided signals before being outputted. In this later case, the number of the pixels is regarded as a half thereof. Although not miniaturized in this method, since the signal charges can be read in parallel, it is possible to increase the signal reading speed.

The effect of reducing the remaining charges in accordance with the driving methods of the above-mentioned embodiments will be described hereinbelow from the probability standpoint. First, the probability that the remaining charges are reduced down to zero in a single line during the transfer between the two registers will be calculated. In the case of the prior art, since the transfer between the two registers is only once, the probability PO (M) at which the remaining charge is zero can be expressed as $$PO(M) = (1-P)M \tag{1}$$

where M denotes the number of buckets for signal charges; and P denotes the probability at which a defective remaining charge occurs when a single signal is transferred between the registers.

In the case where the transfer between the two registers is repeated once, if P1 (M) is a probability at which no remaining charge occurs at the two or more continuously adjacent transfer gates of M-piece transfer gates; A1 (M) is a probability at which remaining charges occur at the m-th gate; and B1 is a probability at which no remaining charges occur at the same m-th gate, the following equations (2) and (3) can be established.

The equation (2) can be expressed as $$\begin{pmatrix} A1(M) \\ B1(M) \end{pmatrix} = \begin{pmatrix} 0 & P \\ 1-P & 1-P \end{pmatrix} \begin{pmatrix} A1(M-1) \\ B1(M-1) \end{pmatrix}$$

$$= \begin{pmatrix} 0 & P \\ 1-P & 1-P \end{pmatrix}^{M-1} \begin{pmatrix} A1(1) \\ B1(1) \end{pmatrix}$$

$$= \begin{pmatrix} 0 & P \\ 1-P & 1-P \end{pmatrix}^{M-1} \begin{pmatrix} P \\ 1-P \end{pmatrix}$$

where $$P1(M) = A1(M) + B1(M) \tag{3}$$

In the case where the transfer between the registers is repeated two and three times, the probability can be obtained in the same way as above. That is, where the transfer between the registers is repeated twice, in the same way as in the single repetition, if P2 (M) is a probability at which three or more continuous no remaining charges occur in all the transfer gates, and further the present or absence of remaining charge at the (M−1)-th gate and the (M)-th gate is classified as listed in Table 1 below, the following equations (3) and (4) can be established.

The equation (4) can be expressed as $$\begin{pmatrix} A2(M) \\ B2(M) \\ C2(M) \\ D2(M) \end{pmatrix} = \begin{pmatrix} 0 & P & 0 & 0 \\ 0 & 0 & P & P \\ 1-P & 1-P & 0 & 0 \\ 0 & 0 & 1-P & 1-P \end{pmatrix}^{M-2} \begin{pmatrix} P^2 \\ P(1-P) \\ P(1-P) \\ (1-P)^2 \end{pmatrix}$$

where $$P2(M) = A2(M) + B2(M) + C2(M) + D2(M) \tag{5}$$

TABLE 1

|        | (M − 1) | (M) |
|--------|---------|-----|
| A2 (M) | Yes     | Yes |
| B2 (M) | No      | Yes |
| C2 (M) | Yes     | No  |
| D2 (M) | No      | No  |

Next, in the case where the transfer between the registers is repeated three times, in the same way as in the single repetition, if P3 (M) is a probability at which four or more continuous no remaining charges occur in all the transfer gate, and further the presence and absence of remaining charge at the (M−1)-th gate and the (M)-th gate is classified, the following equations (6) and (7) can be established.

The equation (6) is expressed as $$\begin{pmatrix} A3(M) \\ B3(M) \\ C3(M) \\ D3(M) \\ E3(M) \\ F3(M) \\ G3(M) \\ H3(M) \end{pmatrix} = \begin{pmatrix} 1-P & 1-P & 0 & 0 & 0 & 0 & 0 & 0 \\ 0 & 0 & 1-P & 0 & 1-P & 0 & 0 & 0 \\ 0 & 0 & 0 & 1-P & 0 & 1-P & 0 & 0 \\ P & P & 0 & 0 & 0 & 0 & 0 & 0 \\ 0 & 0 & 0 & 0 & 0 & 0 & 1-P & 1-P \\ 0 & 0 & P & 0 & P & 0 & 0 & 0 \\ 0 & 0 & 0 & P & 0 & P & 0 & 0 \\ 0 & 0 & 0 & 0 & 0 & 0 & 0 & 0 \end{pmatrix}^{M-3} \begin{pmatrix} (1-P)^3 \\ P(1-P)^2 \\ P(1-P)^2 \\ P(1-P)^2 \\ (1-P)P^2 \\ (1-P)P^2 \\ (1-P)P^2 \\ P^3 \end{pmatrix}$$

where

P3 (*M*)=A3 (*M*)+B3 (*M*)+C3 (*M*)+D3 (*M*)+E3 (*M*)+F3 (*M*)+G3 (*M*)+H3 (*M*)   (7).

On the basis of the above-mentioned equations (1) to (7), the probability that the remaining charge is zero for 1000 signals can be obtained as listed in Table 2 below

TABLE 2

| P | P(0) | P(1) | P(2) | P(3) |
|---|---|---|---|---|
| 0.0001 | 0.906 | >0.999 | >0.999 | >0.999 |
| 0.001 | 0.368 | 0.999 | 0.999 | 0.999 |
| 0.01 | 4 E-5 | 0.906 | 0.999 | >0.999 |
| 0.1 | 2 E-46 | 1 E-4 | 0.406 | 0.914 |

Table 2 lists the probabilities P (n) at which the number of the remaining charges becomes zero for 1000 signals, which can be obtained by expanding the probability P at which the remaining charge occurs for a single signal. Further, n (0, 1, . . . ) denotes the number of repetitions of the transfers between the registers.

The Table 2 indicates that the remaining charges can be reduced markedly by simply repeating the number of transfer between the registers. This marked effect can be obtained easily by changing the drive signal timing without modifying the structure thereof.

As described above, in the charge transfer device according to the present invention, it is possible to prevent the charges from remaining at the charge transfer sections, by repeating the charge transfers between the registers when the charge transfer device is driven. In addition, it is also possible to prevent the transferred signal charge from being mixed with the succeeding signal charge, by applying a driving pulse to the storage section formed on the semiconductor substrate during the signal transfer operation.

What is claimed is:

1. A method of transferring charges generated by signal charge generating sections, through a plurality of transfer electrodes of a plurality of charge transfer sections arranged in parallel to each other and adapted to transfer signal charges in the same direction, comprising the steps of:

transferring a signal charge existing under a transfer electrode of one of the plurality of charge transfer sections, through one of a plurality of connecting sections formed under the transfer electrode corresponding to another of the plurality of charge transfer sections among the plurality of connecting sections formed between the plurality of charge transfer sections, on the basis of a predetermined drive pulse; and after the signal charge has been transferred to the another charge transfer section in a first transfer sequence, transferring a remaining charge left at a primary charge transfer section from the primary charge transfer section to the another charge transfer section in a second transfer sequence, through another connecting section among the plurality of connecting sections, to add the remaining charge to the transferred signal charge.

2. The method of transferring charges of claim 1, wherein the remaining charge is added with the transferred signal charge two or more times for each signal reading operation.

3. The method of transferring charges of claim 1, wherein, until the remaining charge is added with the transferred signal charge at the another charge transfer section, a succeeding charge is temporarily stored in a charge storage section.

4. The method of transferring charges of claim 1, wherein, after the remaining charge has been added with the transferred signal charge at the another charge transfer section, the added signal charge is transferred reversely to under the transfer electrode of the another charge transfer section.

5. The method of transferring charges of claim 1, wherein, during addition of the remaining charge with the transferred signal charge at the another charge transfer section, at least one of the remaining charge and the transferred signal charge is transferred reversely in any of the charge transfer sections.

6. A charge transfer device, comprising:

a plurality of charge transfer sections arranged in parallel to each other, each corresponding to a transfer electrode, the plurality of charge transfer sections transferring signal charges generated by signal charge generating sections in the same direction;

a plurality of connecting sections formed between said plurality of charge transfer sections, for transferring a signal charge existing under some transfer electrode of said plural charge transfer sections to under another transfer electrode corresponding to another charge transfer section on the basis of a drive pulse; and means for adding a charge left at a primary charge transfer section to the signal charge already transferred, after the charge has been transferred to the other charge transfer section in a first transfer sequence, by transferring the left charge from the primary charge transfer section to the other charge transfer section through the other connecting section among the plural connecting sections in a second transfer sequence.

7. The charge transfer device of claim 6, wherein said connecting sections are transfer gates formed between specific transfer electrodes of said charge transfer sections and transfer electrodes corresponding to the other charge transfer sections, respectively for controlling charge transfer.

8. The charge transfer device of claim 7, wherein said specific electrodes are formed alternately to pixels.

9. The charge transfer device of claim 6, which further comprises charge storage sections for temporarily storing the succeeding charge, when a signal charge existing under the one transfer electrode of a charge transfer section of said plural charge transfer sections is being transferred to under a transfer electrode of the adjacent succeeding stage charge transfer section on the basis of a predetermined drive pulse.

10. The charge transfer device of claim 6, wherein the plural transfer electrodes of said plural charge transfer sections are connected to a drive pulse wire for transferring a signal charge through said charge transfer sections in either one of the forward direction and the reverse direction.

11. The charge transfer device of claim 6, wherein said plural charge transfer sections include transfer electrodes of different numbers, respectively.

12. The charge transfer device of claim 6, wherein the number of transfer stages in said charge transfer sections through which one signal charge packet can be transferred is larger than the number of total signal packets.

13. A solid-state image sensing device, comprising on a substrate:

a signal charge generating section for generating signal charges in response to incident light; and the charge transfer device as defined by claim 6, for transferring the signal charges generated by said signal charge generating section.

* * * * *